United States Patent
Takashima

(10) Patent No.: US 10,845,797 B2
(45) Date of Patent: Nov. 24, 2020

(54) INFORMATION PROCESSING DEVICE, INFORMATION PROCESSING METHOD, AND TRANSPORTATION SYSTEM

(71) Applicant: Sony Corporation, Tokyo (JP)

(72) Inventor: Masatoshi Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 15/768,048

(22) PCT Filed: Sep. 1, 2016

(86) PCT No.: PCT/JP2016/075686
§ 371 (c)(1),
(2) Date: Apr. 13, 2018

(87) PCT Pub. No.: WO2017/068871
PCT Pub. Date: Apr. 27, 2017

(65) Prior Publication Data
US 2018/0299880 A1    Oct. 18, 2018

(30) Foreign Application Priority Data

Oct. 21, 2015 (JP) ................................. 2015-207507

(51) Int. Cl.
*G05D 1/00* (2006.01)
*G06Q 50/28* (2012.01)
(Continued)

(52) U.S. Cl.
CPC .......... *G05D 1/0016* (2013.01); *B64C 13/18* (2013.01); *B64C 27/08* (2013.01); *B64C 39/02* (2013.01);
(Continued)

(58) Field of Classification Search
CPC ...... G05D 1/0016; G06Q 10/08; G06Q 50/28; B64D 27/24; B64C 39/02; B64C 27/08;
(Continued)

(56) References Cited

U.S. PATENT DOCUMENTS 7,752,142 B2 *   7/2010   Bjerre ................ G06Q 10/0834
                                                                705/333
9,305,280 B1 *   4/2016   Berg ....................... H04L 67/12
(Continued)

FOREIGN PATENT DOCUMENTS

JP      61-238595 A   * 10/1986   ................ B64F 1/32
JP      08-230983 A      9/1996
(Continued)

OTHER PUBLICATIONS

Umeda M., In the Height of Demonstration Experiments [RFID ni Sonaeru—Fukyo eno Michisuji to Sono Genjitsumi], Computopia, vol. 39, No. 453, Jun. 1, 2004, pp. 40-45 (19 pages including translation).*

(Continued)

*Primary Examiner* — Mary Cheung
(74) *Attorney, Agent, or Firm* — Wolf, Greenfield & Sacks, P.C.

(57) ABSTRACT

[Object] To propose a novel and improved information processing device, a novel and improved information processing method, and a novel and improved transportation system capable of realizing more stable article transportation in article transportation by unmanned flyers.
[Solution] Provided is an information processing device including: a display information control unit configured to control display of a screen used for a user to select a container to be conveyed by an unmanned flyer from candidates for the container on a basis of the candidates for the
(Continued)

container accommodating an article and conveyed by the unmanned flyer in article transportation by the unmanned flyer.

20 Claims, 12 Drawing Sheets

(51) Int. Cl.
*B64D 27/24* (2006.01)
*B64C 39/02* (2006.01)
*G06Q 10/08* (2012.01)
*B64C 27/08* (2006.01)
*B64C 13/18* (2006.01)

(52) U.S. Cl.
CPC ............ *B64C 39/024* (2013.01); *B64D 27/24* (2013.01); *G06Q 10/08* (2013.01); *G06Q 50/28* (2013.01); *B64C 2201/128* (2013.01); *B64C 2201/146* (2013.01)

(58) Field of Classification Search
CPC . B64C 13/18; B64C 39/024; B64C 2201/128; B64C 2201/146
See application file for complete search history.

(56) References Cited

U.S. PATENT DOCUMENTS

| | | | |
|---|---|---|---|
| 2012/0091259 A1 | 4/2012 | Morris et al. | |
| 2015/0120094 A1* | 4/2015 | Kimchi | B64C 39/024 |
| | | | 701/3 |
| 2015/0269521 A1* | 9/2015 | Knapp | G06Q 10/08355 |
| | | | 705/338 |
| 2016/0207627 A1* | 7/2016 | Hoareau | B64D 1/02 |
| 2016/0257401 A1* | 9/2016 | Buchmueller | G06Q 50/28 |
| 2017/0113799 A1* | 4/2017 | Kovac | B64C 25/00 |
| 2018/0194455 A1* | 7/2018 | Park | G05D 1/0038 |

FOREIGN PATENT DOCUMENTS

| | | |
|---|---|---|
| JP | 2001-319106 A | 11/2001 |
| JP | 2002-085489 A | 3/2002 |
| JP | 2003-057065 A | 2/2003 |
| JP | 2003-285930 A | 10/2003 |
| JP | 2005-225576 A | 8/2005 |
| JP | 2005-263112 A | 9/2005 |
| JP | 2008-276292 A | 11/2008 |

OTHER PUBLICATIONS

International Search Report and English translation thereof dated Nov. 15, 2016 in connection with International Application No. PCT/JP2016/075686.

Written Opinion and English translation thereof dated Nov. 15, 2016 in connection with International Application No. PCT/JP2016/075686.

International Preliminary Report on Patentability and English translation thereof dated May 3, 2018 in connection with International Application No. PCT/JP2016/075686.

* cited by examiner

FIG. 7
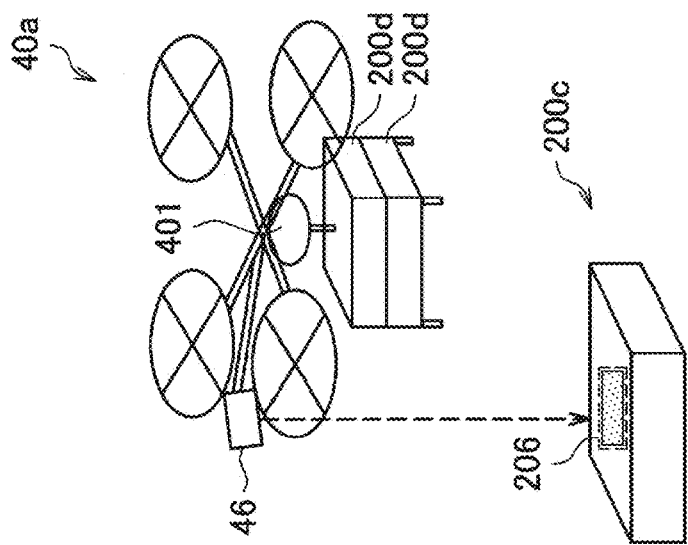
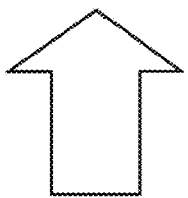
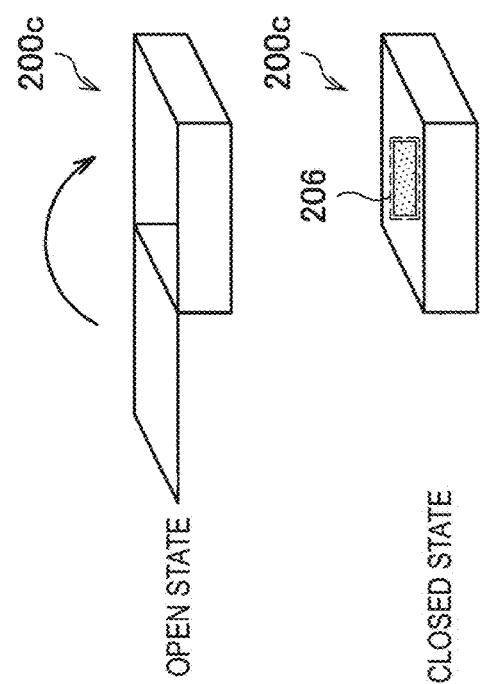
OPEN STATE
CLOSED STATE

INFORMATION PROCESSING DEVICE, INFORMATION PROCESSING METHOD, AND TRANSPORTATION SYSTEM

Cross-Reference to Related Applications

This application claims the benefit under 35 U.S.C. § 371 as a U.S. National Stage Entry of International Application No. PCT/JP2016/075686, filed in the Japanese Patent Office as a Receiving Office on Sep. 1, 2016, which claims priority to Japanese Patent Application Number JP2015-207507, filed in the Japanese Patent Office on Oct. 21, 2015, each of which is hereby incorporated by reference in its entirety.

TECHNICAL FIELD

The present disclosure relates to an information processing device, an information processing method, and a transportation system.

BACKGROUND ART

In recent years, technologies for unmanned flyers controlled by radio have been proposed (for example, see Patent Literature 1 or the like). By applying such unmanned flyers to article transportation, the cost of article transportation is expected to be suppressed.

CITATION LIST

Patent Literature

Patent Literature 1: US Patent Application Publication No. 2012/0091259

DISCLOSURE OF INVENTION

Technical Problem

Here, in article transportation by unmanned flyers, it is preferable to realize more stable article transportation.

Accordingly, the present disclosure proposes a novel and improved information processing device, a novel and improved information processing method, and a novel and improved transportation system capable of realizing more stable article transportation in article transportation by unmanned flyers.

Solution to Problem

According to the present disclosure, there is provided an information processing device including: a display information control unit configured to control display of a screen used for a user to select a container to be conveyed by an unmanned flyer from candidates for the container on a basis of the candidates for the container accommodating an article and conveyed by the unmanned flyer in article transportation by the unmanned flyer.

In addition, according to the present disclosure, there is provided an information processing method including: controlling, by an information processing device, display of a screen used for a user to select a container to be conveyed by an unmanned flyer from candidates for the container on a basis of the candidates for the container accommodating an article and conveyed by the unmanned flyer in article transportation by the unmanned flyer.

In addition, according to the present disclosure, there is provided a transportation system including: an information processing device configured to control an unmanned flyer that transports an article accommodated in a container selected by a user and transportation of the article by the unmanned flyer. The information processing device includes a display information control unit that controls display of a screen used for a user to select the container to be conveyed by the unmanned flyer from candidates for the container on a basis of the candidates for the container accommodating the article and conveyed by the unmanned flyer in article transportation by the unmanned flyer, and a transportation control unit that controls the article transportation by the unmanned flyer on a basis of information regarding the container selected by the user on the screen.

Advantageous Effects of Invention

According to the present disclosure, as described above, it is possible to realize more stable article transportation in article transportation by unmanned flyers.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram illustrating a configuration of a container according to a third modification example.

MODE(S) FOR CARRYING OUT THE INVENTION

Figure 1:
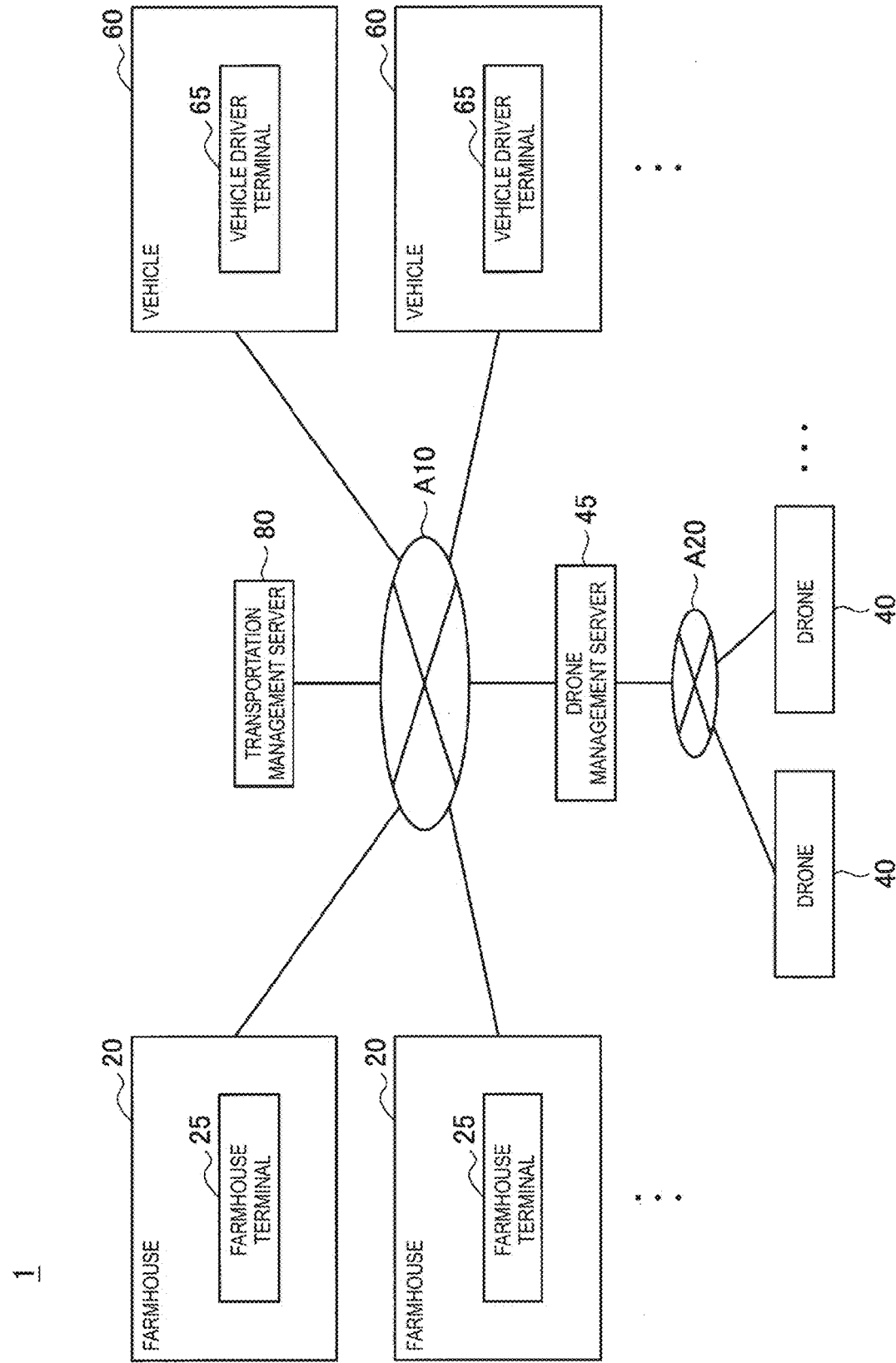
FIG. 1 is an explanatory diagram illustrating an example of a configuration of a transportation system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.
0. Introduction
1. Transportation system
2. Drone
3. Container
4. Transportation management server
4-1. Functional configuration
4-2. Operation
5. Hardware configuration
6. Conclusion

0. Introduction

The world population is currently increasing. For example, the worldwide population is expected to exceed 9.0 billion in 2050. Thus, with food problems associated with the future increase in population, advances in efficient and large-scale agriculture industry are in progress across the world. In the way that Russia overcame its economic crisis with farm products produced in second houses (dachas) with self-supply farms, societies capable of surviving food crises can be constructed by increasing small self-sufficient farmhouses. With the ongoing aging of the population of users in small farmhouses in many countries, a ratio of the aged has increased. In order for the aged to have something to live for and continue to produce farm products for a long time, it is important to distribute farm products produced in small farmhouses at reasonable prices.

In the related art, systems for article transportation using various movers have been proposed. Specifically, systems for transporting articles using unmanned flyers such as drones have been proposed. When articles are transported by unmanned flyers, the cost of article transportation is expected to be suppressed. For example, by transporting farm products produced in the above-described small self-sufficient farmhouses using unmanned flyers such as drones, it is possible to realize distribution of the farm products produced in the small farmhouses at reasonable prices. Here, in article transportation by unmanned flyers, for example, in a case in which the weights of articles transported by the unmanned flyers exceed loadable weights of the unmanned flyers, flight attitudes of the unmanned flyers may be unstable. Thus, there is a concern of transported articles falling.

Accordingly, the present specification proposes a structure capable of realizing more stable article transportation in article transportation by an unmanned flyer.

1. Transportation System

Figure 2:
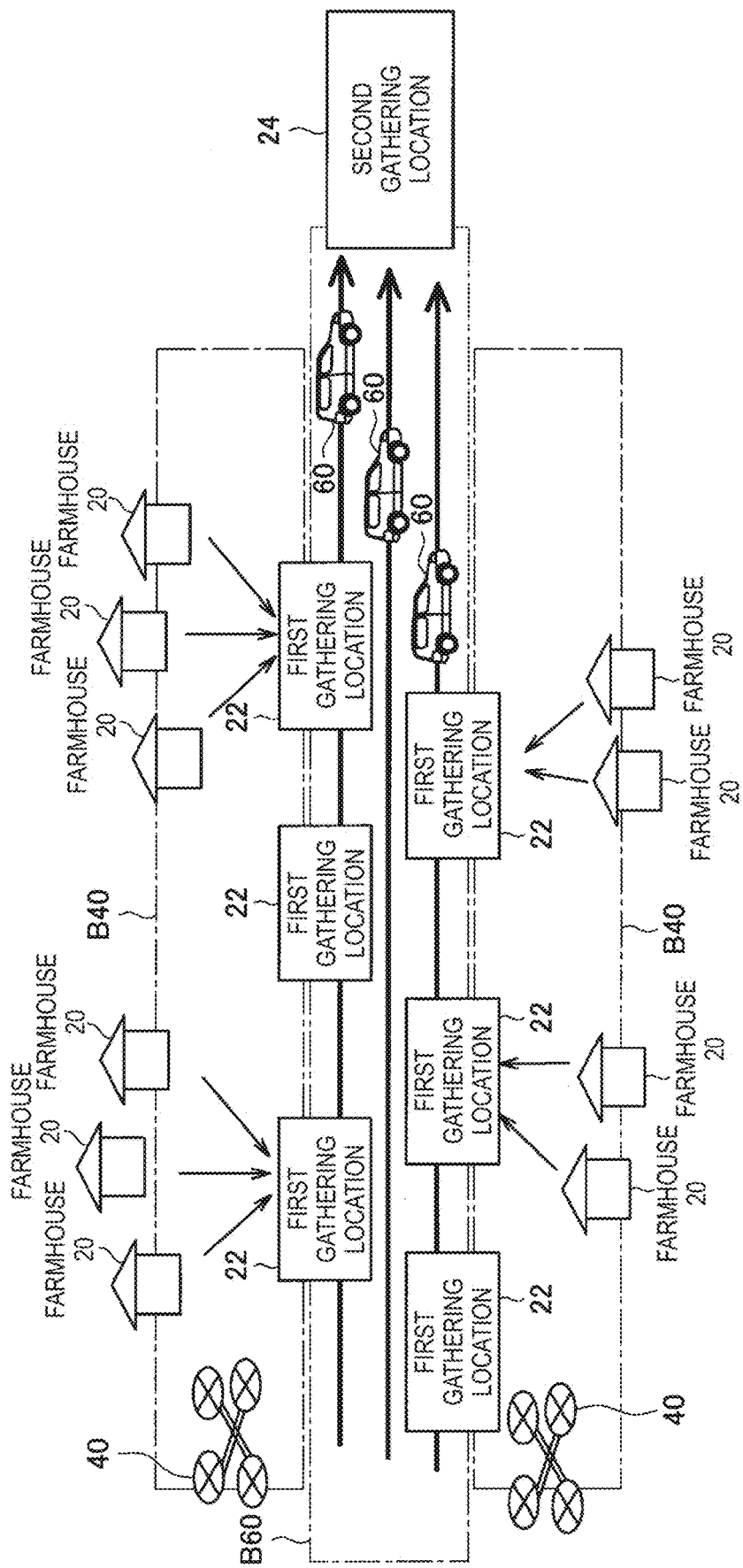
FIG. 2 is an explanatory diagram illustrating an example of a flow of farm products in transportation of the farm products by the transportation system according to the embodiment.

Next, a transportation system 1 according to an embodiment will be described with reference to FIGS. 1 and 2. FIG. 1 is an explanatory diagram illustrating an example of a configuration of the transportation system 1 according to the embodiment. FIG. 2 is an explanatory diagram illustrating an example of a flow of farm products in transportation of the farm products by the transportation system 1 according to the embodiment. As illustrated in FIG. 1, the transportation system 1 includes farmhouse terminals 25 that are used by users of farmhouses 20, drones 40, a drone management server 45, vehicle driver terminals 65 that are used by drivers of vehicles 60, and a transportation management server 80. The farmhouse terminals 25, the drone management server 45, the vehicle driver terminals 65, and the transportation management server 80 communicate with each other via a wired or wireless information network A10. Moreover, the drones 40 and the drone management server 45 communicate with each other via a wired or wireless information network A20.

In addition, in FIG. 1, two farmhouse terminals 25 are illustrated for one transportation management server 80 and two vehicle driver terminals 65 are illustrated for one drone management server 45, but the numbers of farmhouse terminals 25, drone management server 45, and vehicle driver terminals 65 communicating with one transportation management server 80 may be other numbers equal to or greater than 1. Moreover, in FIG. 1, two drones 40 are illustrated for one drone management server 45, but the number of drones 40 communicating with one drone management server 45 may be another number equal to or greater than 1.

The farmhouse terminals 25 illustrated in FIG. 1 are mainly used by users of the farmhouses 20 to request the transportation management server 80 to transport farm products produced by the users of the farmhouses 20 using the drone 40. In addition, the farm products are examples of articles that are transported by unmanned flyers according to the present disclosure. The farmhouse terminal 25 has a function of communicating with an external device, a function of displaying a screen and a function of receiving an input of a user of the farmhouse. The foregoing functions of the farmhouse terminal 25 are realized, for example, by a device such as a personal computer, a smartphone, or a tablet terminal.

Display of a screen on the farmhouse terminal 25 is controlled by the transportation management server 80. For example, the farmhouse terminal 25 displays an input screen as a display method in which the user inputs information necessary to allow the drone 40 to transport farm products. Here, in the transportation of farm products by the drone 40, a container is conveyed by the drone 40 in a state in which the farm products are accommodated in the container. For example, the farmhouse terminal 25 displays, as the input screen, a screen used for the user to select a container to be conveyed by the drone 40 from candidates for the container. Moreover, the farmhouse terminal 25 transmits information input by the user on the input screen to the transportation management server 80. For example, the farmhouse terminal 25 transmits information regarding the container selected by the user on the input screen to the transportation management server 80. The information regarding the container transmitted from the farmhouse terminal 25 is used for the transportation management server 80 to generate transportation schedule data of the drone 40.

The drone 40 is an example of an unmanned flyer according to the present disclosure. The drone 40 is an unmanned flyer that can automatically fly on a basis of a designated flight path and transport an article. Specifically, the drone 40 transports farm products to a gathering location designated from the designated farmhouses 20 (hereinafter also referred to as a first gathering location). The drone 40 flies in a section B40 from the farmhouse 20 to the first gathering location 22, as schematically illustrated in FIG. 2, and transports farm products from the farmhouse 20 to the first gathering location 22. In each first gathering location 22, farm products transported from the plurality of farmhouses 20 may be gathered. Moreover, the drone 40 may collect farm products from the plurality of farmhouses 20 in one flight to transport the farm products to the first gathering location 22 or to separately send the collected farm products to the plurality of first gathering locations 22. Here, the first gathering locations 22 are provided in, for example, places through which the vehicles 60 pass more easily than the farmhouses 20.

The drone 40 can fly using, for example, four rotors and can fly while ascending, descending, and horizontally moving by controlling rotation of each rotor. Of course, the number of rotors is not limited to such an example. The drone 40 flies on a basis of an operation instruction from the drone management server 45. The operation instruction from the drone management server 45 is given on the basis of the transportation schedule data of the drone 40 generated by the transportation management server 80. Therefore, a flight path of the drone 40 is designated on the basis of the transportation schedule data of the drone 40 generated by the transportation management server 80. A flight path from a flight starting position to a flight ending position designated in the transportation schedule data of the drone 40, a collection position of a container, and the position of a conveyance destination of the container are represented by latitude, longitude, and altitude corresponding to the positions and are set as, for example, positional information of the Global Positioning System (GPS). Accordingly, a GPS receiver that receives radio waves from a GPS satellite and calculates a current position can be embedded in the drone 40.

Moreover, the drone 40 can transmit various kinds of information to the drone management server 45. For example, the drone 40 transmits information indicating that transportation of farm products by the drone 40 is completed (hereinafter also referred to as gathering information of the first gathering location 22) to the drone management server 45 when the transportation of the farm products to the first gathering location 22 designated from the designated farmhouse 20 is completed. The gathering information of the first gathering location 22 transmitted to the drone management server 45 is transmitted to the transportation management server 80 by the drone management server 45. In addition, the details of the drone 40 will be described below.

The drone management server 45 illustrated in FIG. 1 transmits an operation instruction to the drone 40. Specifically, the drone management server 45 transmits an operation instruction to the drone 40 on the basis of the transportation schedule data of the drone 40 generated by the transportation management server 80. Moreover, the drone management server 45 transmits information regarding each drone 40 to the transportation management server 80. For example, the drone management server 45 transmits information indicating the position of each drone 40, information indicating whether or not each drone 40 can operate, and ID information of each drone 40 to the transportation management server 80. The information transmitted from the drone management server 45 is used for the transportation management server 80 to generate the transportation schedule data of the drones 40.

The vehicle driver terminal 65 illustrated in FIG. 1 is mainly used by a driver of the vehicle 60 to communicate with the transportation management server 80 in regard to transportation of farm products by the vehicle 60. The vehicle driver terminal 65 has a function of communicating with an external device, a function of displaying a screen, and a function of receiving an input of the driver of the vehicle 60. The foregoing functions of the vehicle driver terminal 65 are realized, for example, by a device such as a personal computer, a smartphone, or a tablet terminal.

Here, the vehicle 60 transporting farm products travels in a section B60 from the first gathering location 22 to the second gathering location 24 schematically illustrated in FIG. 2 to further transport farm products transported to the first gathering location 22 by the drone 40 to the second gathering location 24 which is a gathering location different from the first gathering location 22. The farm products collected from the plurality of first gathering locations 22 can be transported to the second gathering location 24. Thus, the farm products of the plurality of farmhouses 20 are gathered in the second gathering location 24. The vehicle 60 can include a private automobile, a commutation vehicle, a taxi, and an automatic traveling taxi.

The vehicle driver terminal 65 transmits information input by the driver of the vehicle 60 in advance for the transportation of the farm products which are gathered products to the transportation management server 80. Specifically, the vehicle driver terminal 65 transmits information regarding a traveling schedule of the vehicle 60 as the information input by the driver of the vehicle 60, information indicating a loadable weight of the vehicle 60, identification information of the vehicle 60, and information regarding the driver to the transportation management server 80. The information regarding the traveling schedule of the vehicle 60 can include information indicating the first gathering location 22 through which the vehicle 60 can pass and information indicating a time at which the vehicle 60 is scheduled to pass through the first gathering location 22. The information transmitted from the vehicle driver terminal 65 is used for the transportation management server 80 to generate the transportation schedule data of the drone 40. The driver inputs the information regarding the traveling schedule of the vehicle 60, the information indicating the sizes or the weights of loadable gathered products of the vehicle 60, the identification information of the vehicle 60, and the information regarding the driver. Additionally, information may be automatically accumulated, for example, using data retained in a predetermined server or using a sensor mounted on a vehicle.

Moreover, the vehicle driver terminal 65 receives the transportation schedule data of the vehicle 60 and the information indicating that the gathering of farm products scheduled to be gathered in the first gathering location 22 is entirely completed from the transportation management server 80 and displays each piece of information. Thus, the driver of the vehicle 60 can perform the transportation of the farm products by the vehicle 60 in accordance with the transportation schedule data of the vehicle 60. Here, the first gathering location 22 which is a collection destination of the farm products of each vehicle 60 is designated in schedule data of the vehicle 60. When the transportation of the farm products from the designated first gathering location 22 to the second gathering location 24 is completed, the vehicle driver terminal 65 transmits information indicating that the transportation of the farm products by the vehicle 60 is completed (hereinafter also referred to as gathering information of the second gathering location 24) to the transportation management server 80.

The transportation management server 80 illustrated in FIG. 1 is an example of the information processing device according to the present disclosure. The transportation management server 80 manages the transportation of the farm products by the drone 40 and the vehicle 60. For the transportation of the farm products by the drone 40, specifically, the transportation management server 80 controls the transportation of the farm products by the drone 40 on the basis of the information transmitted from the farmhouse terminal 25, the drone management server 45, and the vehicle driver terminal 65. The transportation management server 80 controls the transportation of the farm products by the drone 40, for example, by generating the transportation schedule data of the drone 40 and transmitting the transportation schedule data to the drone management server 45. Here, the transportation schedule data of the drone 40 is schedule data defining farm products transported by each drone 40, a flight path of each drone 40, an arrival time of each drone 40 at the farmhouse 20, and an arrival time of each drone 40 at the first gathering location 22. The transportation management server 80 generates the transportation schedule data of the drones 40 so that operation efficiency or the like of the drones 40 is improved on the basis of the information transmitted from the farmhouse terminal 25, the drone management server 45, and the vehicle driver terminal 65.

Moreover, the transportation management server 80 stores candidates for a container that is conveyed by the drone 40 and accommodates farm products in advance in the transportation of the farm products by the drone 40 and controls display of a screen used for the user to select the container to be conveyed by the drone 40 from the candidates for the container. Specifically, the volumes of the candidates of the container are set so that the weight of the container conveyed by the drone 40 does not exceed a loadable weight of the drone 40. Here, the weight of the farm product is substantially proportional to the volume of the farm product. Therefore, a maximum value of the weight of the container in a state in which the farm product is accommodated can be calculated in accordance with the volume of the container. Accordingly, by allowing the user of the farmhouse 20 to select the container to be conveyed by the drone 40 from the candidates for the container set in advance, it is possible to prevent a flight attitude of the drone 40 from being unstable since the weight of the container conveyed by the drone 40 exceeds the loadable weight. Accordingly, in the transportation management server 80 according to the embodiment, it is possible to realize more stable transportation of the farm products in the transportation of the farm products by the drone 40.

In the transportation of the farm products by the vehicle 60, specifically, the transportation management server 80 generates transportation schedule data of the vehicle 60 on the basis of the generated transportation schedule data of the drone 40 and notifies the driver of the vehicle 60 of the transportation schedule data of the vehicle 60 by transmitting the transportation schedule data of the vehicle 60 to the vehicle driver terminal 65. Here, the transportation schedule data of the vehicle 60 is schedule data defining farm products transported by each vehicle 60, a traveling path of each vehicle 60, an arrival time of each vehicle 60 at the first gathering location 22, and an arrival time of each vehicle 60 at the second gathering location 24.

Moreover, when the gathering of the farm products by the drone 40 in the first gathering location 22 is entirely completed, the transportation management server 80 transmits information indicating that the gathering of the farm products scheduled to be gathered in the first gathering location 22 is entirely completed to the vehicle driver terminal 65 on the basis of the gathering information of the first gathering location 22 transmitted from the drone 40. Thus, the transportation of the farm products in accordance with the transportation schedule data of the vehicle 60 can be performed by the driver of the vehicle 60. In addition, the details of the transportation management server 80 will be described below.

2. Drone

Figure 3:
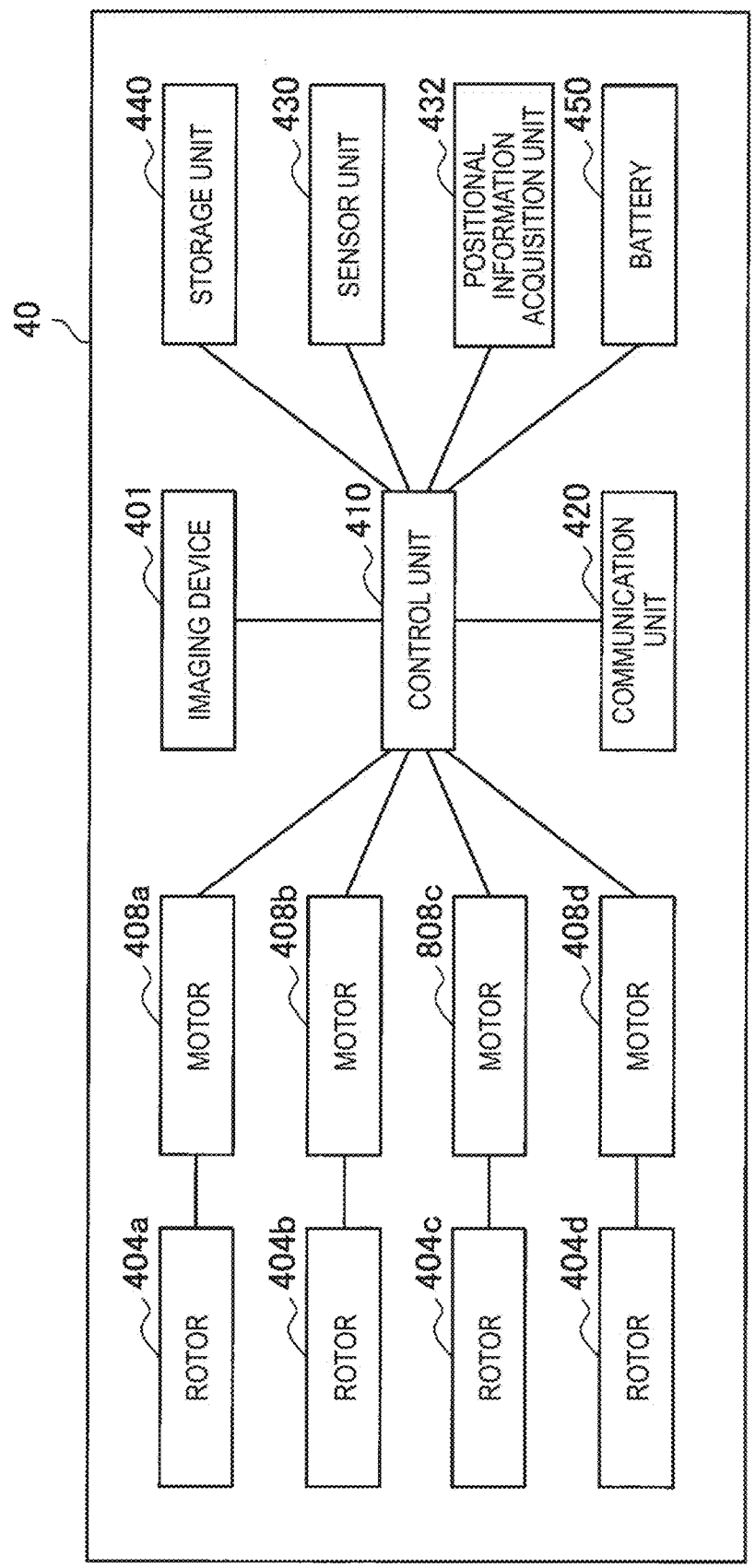
FIG. 3 is an explanatory diagram illustrating an example of a functional configuration of a drone according to the embodiment.

Next, a functional configuration of the drone 40 according to the embodiment will be described. FIG. 3 is an explanatory diagram illustrating an example of the functional configuration of the drone 40 according to the embodiment. As illustrated in FIG. 3, the drone 40 according to the embodiment includes an imaging device 401, rotors 404a to 404d, motors 408a to 408d, a control unit 410, a communication unit 420, a sensor unit 430, a positional information acquisition unit 432, a storage unit 440, and a battery 450.

The control unit 410 includes a central processing unit (CPU) that is an arithmetic processing device, a read-only memory (ROM) that stores arithmetic parameters or a program used by the CPU, and a random access memory (RAM) that temporarily stores a program used for execution by the CPU, parameters appropriately changed in the execution, or the like. The control unit 410 controls an operation of the drone 40. For example, the control unit 410 can control adjustment of rotation speeds of the rotors 404a to 404d through adjustment of rotation speeds of the motors 408a o 408d, an imaging process by the imaging device 401, a process of transmitting and receiving information to and from another device (for example, the drone management server 45) via the communication unit 420, storing or reading of information in and from the storage unit 440. In the embodiment, the control unit 410 controls flight of the drone 40 by adjusting the rotation speeds of the motor 408a to 408d on a basis of flight information transmitted from the drone management server 45.

The imaging device 401 includes a lens, an image sensor such as a CCD image sensor or a CMOS image sensor, and a flash. The imaging device 401 may have a function of recognizing a target shown in an image obtained through an imaging process from the image. Moreover, the imaging device 401 acquires information indicating a positional relation between the recognized target and the drone 40. Thus, the drone 40 can recognize a container accommodating farm products and collect the container more reliably. An image obtained through the imaging process by the imaging device 401 can be stored in the storage unit 440 or can be transmitted from the communication unit 420 to the drone management server 45.

The rotors 404a to 404d cause dynamic lift by rotation to fly the drone 40. The rotation of the rotors 404a to 404d is driven by the motors 408a to 408d. The driving of the motors 408a to 408d can be controlled by the control unit 410.

The communication unit 420 includes a communication circuit and an antenna and performs a process of transmitting and receiving information through wireless communication with the drone management server 45. For example, the communication unit 420 receives an operation instruction for flight from the drone management server 45. Moreover, the communication unit 420 transmits various kinds of information acquired by the sensor unit 430 and the positional information acquisition unit 432 to the drone management server 45.

The sensor unit 430 is a device group that acquires a state of the drone 40 and can include, for example, an acceleration sensor, a gyro sensor, an ultrasonic sensor, an atmospheric pressure sensor, an optical flow sensor, and a laser range finder. The sensor unit 430 can convert the acquired state of the drone 40 into a predetermined signal and supply the predetermined signal to the control unit 410 and the communication unit 420 as necessary. The sensor unit 430 detects an obstacle which may be likely to interrupt flight at the time of the flight. When the sensor unit 430 detects an obstacle, the drone 40 can supply information regarding the detected obstacle to another device.

The positional information acquisition unit 432 acquires information of a current position of the drone 40 using, for example, position data by a GPS or information of a surrounding environment of the drone 40 by the imaging device 401 or the sensor unit 430. The positional information acquisition unit 432 can supply the acquired information of the current position of the drone 40 to the control unit 410 and the communication unit 420 as necessary. The control unit 410 performs flight control of the drone 40 based on the flight information received from the drone management server 45 using the information of the current position of the drone 40 acquired by the positional information acquisition unit 432.

The storage unit 440 stores various kinds of information. Examples of the information stored by the storage unit 440 can include an operation instruction transmitted from the drone management server 45 on the basis of the transportation schedule data of the drone 40 generated by the transportation management server 80 and an image captured by the imaging device 401.

The battery 450 stores power for operating the drone 40. The battery 450 may be a primary battery capable of discharging electricity only or may be a secondary battery capable of also charging electricity. In a case in which the battery 450 is a secondary battery, power can be supplied from, for example, a charging station (not illustrated) to the battery 450.

The drone 40 according to the embodiment has the configuration illustrated in FIG. 3, and thus can automatically fly on the basis of the designated flight path corresponding to the operation instruction transmitted from the drone management server 45 and transport farm products to the first gathering location 22 designated from the designated farmhouse 20. Moreover, as described above, in the transportation of the farm products by the drone 40, the container is conveyed by the drone 40 in the state in which the farm products are accommodated in the container.

Figure 4:
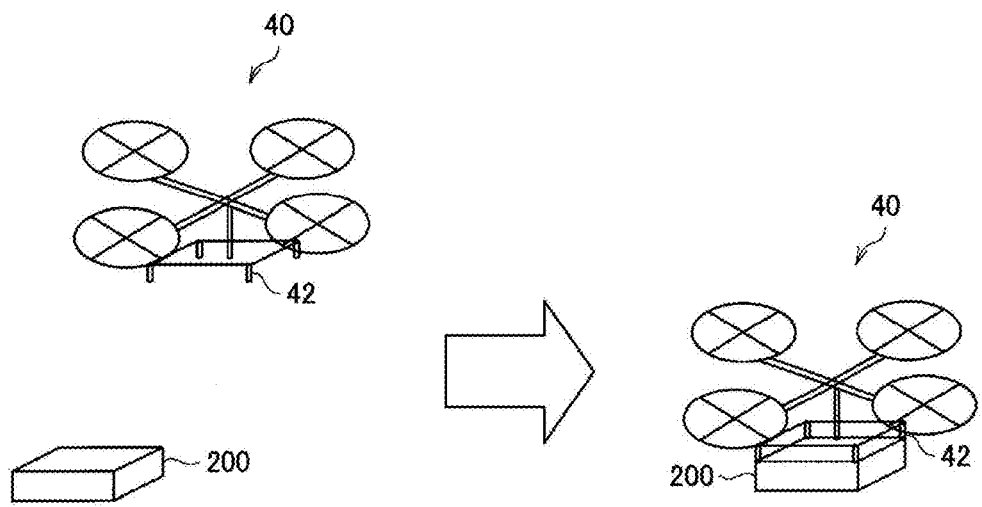
FIG. 4 is an explanatory diagram illustrating conveyance of a container by the drone according to the embodiment.

FIG. 4 is an explanatory diagram illustrating conveyance of the container 200 by the drone 40 according to the embodiment. Specifically, FIG. 4 illustrates the state of the drone 40 before and after the collection of the container 200 by the drone 40.

As illustrated in FIG. 4, a gripping mechanism 42 that grips the container 200 is provided in a lower portion of the drone 40. The gripping mechanism 42 has a function of fitting the container 200 in the drone 40. For example, when the drone 40 moves down from the vertically upper side of the container 200 in the fitting of the container 200 in the drone 40, a locking portion (not illustrated) provided in a lower portion of the gripping mechanism 42 locks a lock portion (not illustrated) provided in an upper portion of the container 200. Thus, when the gripping mechanism 42 fits the container 200 in the drone 40, the drone 40 can convey the container 200. In addition, the container 200 may be manually or automatically detached from the drone 40.

3. Container

Figure 5:
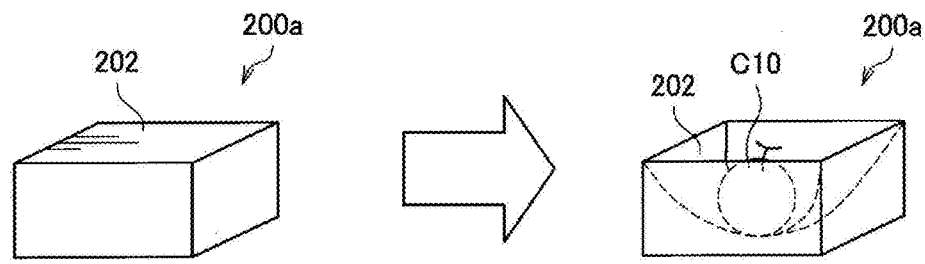
FIG. 5 is an explanatory diagram illustrating a configuration of a container according to a first modification example.

Next, various modification examples of the container 200 will be described with reference to FIGS. 5 to 7. FIG. 5 is an explanatory diagram illustrating a configuration of a container 200a according to a first modification example. Specifically, FIG. 5 illustrates states of the container 200a before and after a farm product C10 is accommodated in the container 200a. In the container 200a according to the first modification example, a holding mechanism 202 that holds a farm product is provided at a position substantially matching a position of the center of gravity of the drone 40 on the horizontal plane. For example, the holding mechanism 202 may include a member that has elasticity and is provided to close an opening located in an upper portion of the container 200a. As the holding mechanism 202, for example, a sheet material or a film material with an elastic property can be used. The holding mechanism 202 is fixed to an edge of the opening of the container 200a. Thus, when the farm product C10 is input from the upper side of the holding mechanism 202, as illustrated in FIG. 5, the holding mechanism 202 is deformed such that a middle portion becomes sunk below due to the load of the farm product C10. Therefore, the farm product C10 is held in the middle of the container 200a on the horizontal plane.

Here, the container 200a is fitted in the drone 40 so that the position of the center of gravity of the drone 40 and the middle of the container 200a substantially match each other on the horizontal plane. Accordingly, according to the first modification example, the farm product C10 is held by the holding mechanism 202 at the position substantially matching the position of the center of gravity of the drone 40 on the horizontal plane. Thus, during the flight of the drone 40 conveying the container 200a, it is possible to prevent the farm product C10 in the container 200a from being deviated from the position of the center of gravity of the drone 40 on the horizontal plane. Therefore, during the flight of the drone 40, it is possible to prevent the attitude of the drone 40 from titling. Therefore, it is possible to realize more stable flight of the drone 40 in the transportation of the farm product C10.

Figure 6:
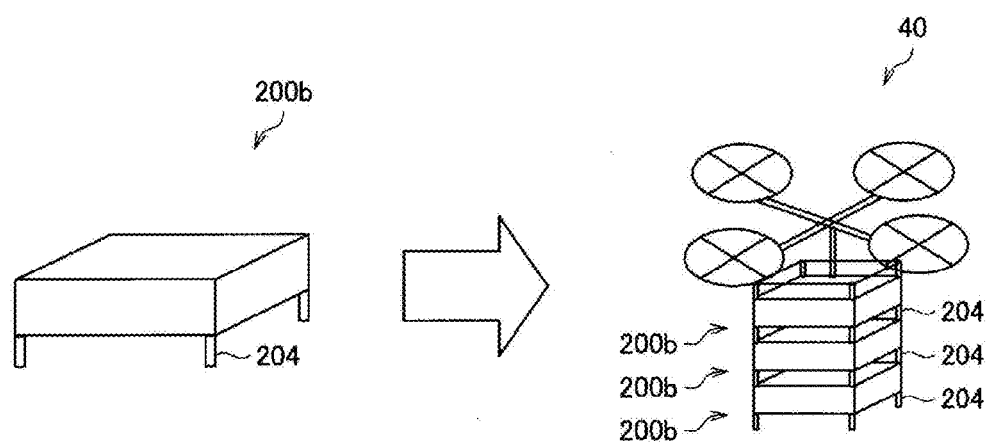
FIG. 6 is an explanatory diagram illustrating a configuration of a container according to a second modification example.

FIG. 6 is an explanatory diagram illustrating a configuration of a container 200b according to a second modification example. Specifically, the left drawing of FIG. 6 illustrates one container 200b before collection by the drone 40 and the right drawing of FIG. 6 illustrates the plurality of containers 200b which are being conveyed by the drone 40 in a mutually stacked state. In the container 200b according to the second modification example, a connection mechanism 204 connecting the container 200b to another container 200b is provided. For example, the plurality of connection mechanisms 204 are provided on the bottom surface of the container 200b, as illustrated in FIG. 6. Specifically, in a state in which the plurality of containers 200b are stacked, the mutually adjacent containers 200b can be connected by the connection mechanisms 204. When the connection mechanisms 204 are provided in each container 200b, the plurality of containers 200b can be conveyed by the drone 40 in the mutually stacked state in the transportation of the farm products by the drone 40. Thus, in a case in which the drone 40 can afford the loadable weight for the weight of the container 200b fitted in the drone 40 in the transportation of farm products, an amount of farm products transported by the drone 40 can be increased by additionally fitting the container 200b in the drone 40. Accordingly, it is possible to improve operation efficiency of the drone 40 in the transportation of farm products.

FIG. 7 is an explanatory diagram illustrating a configuration of a container 200c according to a third modification example. Specifically, the left drawing of FIG. 7 illustrates an open state in which a lid of an upper portion of the container 200c is opened and a closed state in which the lid is closed. The right drawing of FIG. 7 illustrates a state in which a drone 40a according to the modification example images an ID identification portion 206 of the container 200c. In the container 200c according to the third modification example, the ID identification portion 206 for identifying an ID of a user of the farmhouse 20 is provided. For example, as illustrated in FIG. 7, the ID identification portion 206 is provided on the outer surface of the openable lid located in an upper portion of the container 200c. In a state in which the lid is closed, the ID identification portion 206 can be seen from the vertical upper side.

Here, the imaging device 401 is provided at a position substantially matching the position of the center of gravity of the drone 40 on the horizontal plane in some cases to stabilize the flight of the drone 40a. In this case, when the drone 40a is conveying the container 200d, a visual field is blocked by the container 200d fitted in the drone 40a and located below the imaging device 401. Therefore, it may be difficult to image the ID identification portion 206 of the uncollected container 200c in some cases. Here, in the drone 40a according to the modification example, a mirror 46 is provided so that the ID identification portion 206 of the uncollected container 200c can be imaged by the imaging device 401 without blocking the visual field by the container 200d fitted in the drone 40a when the drone 40a is conveying the container 200d. Since a reflection surface of the mirror 46 is provided to face the lower side, the imaging device 401 can image the ID identification portion 206 of the uncollected container 200c. Then, the imaging device 401 can acquire ID information of the user of the farmhouse 20 corresponding to the uncollected container 200c by recognizing the ID identification portion 206 from an image obtained through the imaging process. Thus, it is possible to collect the container 200c accommodating farm products designated in accordance with the transportation schedule data of the drone 40a more reliably.

4. Transportation Management Server

[4-1. Functional Configuration]

Figure 8:
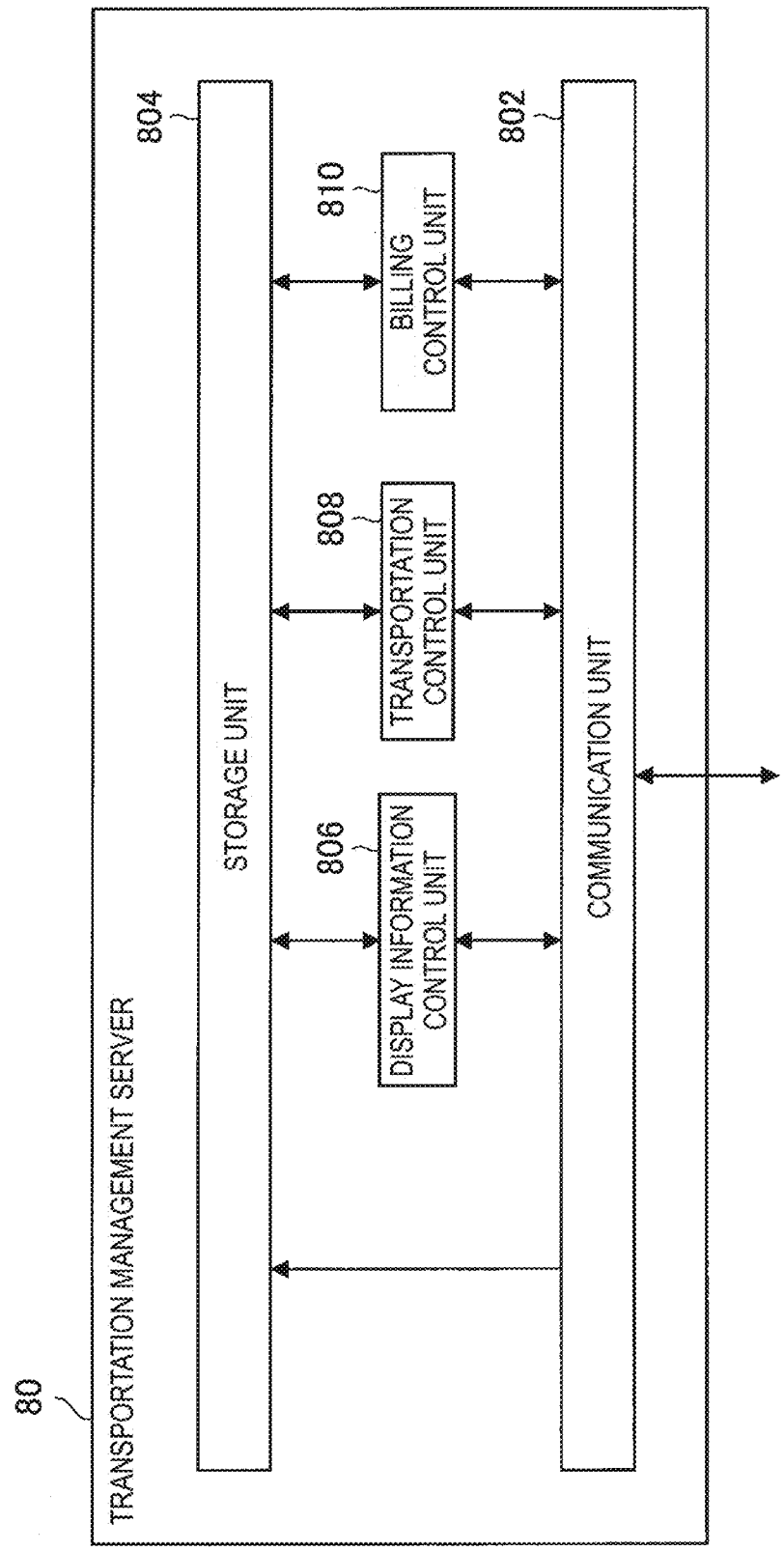
FIG. 8 is an explanatory diagram illustrating an example of a functional configuration of a transportation management server according to the embodiment.

Next, a functional configuration of the transportation management server 80 according to the embodiment will be described. FIG. 8 is an explanatory diagram illustrating an example of a functional configuration of the transportation management server 80 according to the embodiment. As illustrated in FIG. 8, the transportation management server 80 includes a communication unit 802, a storage unit 804, a display information control unit 806, a transportation control unit 808, and a billing control unit 810.

(Communication Unit)

The communication unit 802 includes a communication circuit and communicates with an external device of the transportation management server 80. Specifically, the communication unit 802 communicates with the farmhouse terminal 25, the drone management server 45, and the vehicle driver terminal 65 via a wired or wireless network A10. The communication unit 802 outputs information received from the farmhouse terminal 25, the drone management server 45, and the vehicle driver terminal 65 to the storage unit 804, the display information control unit 806, the transportation control unit 808, and the billing control unit 810. Moreover, the communication unit 802 communicates with an external device of the transportation management server 80 on a basis of an operation instruction from each of the display information control unit 806, the transportation control unit 808, and the billing control unit 810.

For example, the communication unit 802 transmits the transportation schedule data of the drone 40 and the transportation schedule data of the vehicle 60 to the drone management server 45 and the vehicle driver terminal 65, respectively, on the basis of the operation instruction of the transportation control unit 808. Moreover, the communication unit 802 receives the gathering information of the first gathering location 22 transmitted from the drone 40 via the drone management server 45. Moreover, the communication unit 802 receives the gathering information of the second gathering location 24 transmitted from the vehicle driver terminal 65.

(Storage Unit)

The storage unit 804 includes a ROM, a RAM, a nonvolatile memory storage, and a hard disk and stores data which is referred to for various processes in the transportation management server 80. For example, the storage unit 804 stores candidates for the container 200 accommodating farm products and conveyed by the drone 40 in advance in the transportation of the farm products by the drone 40. The volumes of the candidates for the container 200 can be set so that the weight of the container 200 weights does not exceed the loadable weight of the drone 40 in the state in which the farm products are accommodated.

(Display Information Control Unit)

The display information control unit 806 is realized by a CPU and controls display of a screen by an external device. Specifically, the display information control unit 806 controls display of screens of the farmhouse terminal 25 and the vehicle driver terminal 65 by causing the communication unit 802 to transmit information for displaying various screens on the farmhouse terminal 25 and the vehicle driver terminal 65 to the farmhouse terminal 25 and the vehicle driver terminal 65.

The display information control unit 806 controls display of a screen used for the user of the farmhouse 20 to select the container 200 to be conveyed by the drone 40 from the candidates for the container 200 based on the candidates for the container 200 containing the farm products and conveyed by the drone 40 in the transportation of the farm products by the drone 40. For example, the display information control unit 806 displays a screen used for the user of the farmhouse 20 to select the container 200 to be conveyed by the drone 40 from the candidates for the container 200 on the farmhouse terminal 25 on the basis of the candidates for the container 200 stored in advance in the storage unit 804.

In the control of the display of the screen on the farmhouse terminal 25 by the display information control unit 806, the communication unit 802 may transmit information necessary for the farmhouse terminal 25 to display the screen to the farmhouse terminal 25. The communication unit 802 may transmit, as the information, for example, data with a format such as the HTML format, the CSS format, the Java Script (registered trademark) format to the farmhouse terminal 25, and the farmhouse terminal 25 may display the screen on the basis of the received data.

Moreover, in the control of the screen displayed on the farmhouse terminal 25 by the display information control unit 806, the communication unit 802 may transmit information necessary to display predetermined GUI data among GUI data included in an application installed in advance and stored in the farmhouse terminal 25 to the farmhouse terminal 25. The communication unit 802 may transmit, as the information, for example, parameters necessary for the farmhouse terminal 25 to display the predetermined GUI data to the farmhouse terminal 25 and the farmhouse terminal 25 may display the predetermined GUI data on the basis of the received parameters. The parameters transmitted from the communication unit 802 to the farmhouse terminal 25 are, for example, parameters corresponding to the candidates for the container 200.

Moreover, in the control of the control of the display of the screen on the farmhouse terminal 25 by the display information control unit 806, the communication unit 802 may transmit GUI data to be displayed by the farmhouse terminal 25 to the farmhouse terminal 25. The GUI data transmitted from the communication unit 802 to the farmhouse terminal 25 is, for example, GUI data corresponding to the candidates for the container 200. The GUI data may be generated by the transportation management server 80 or may be stored in advance in the storage unit 804 of the transportation management server 80.

Figure 9:
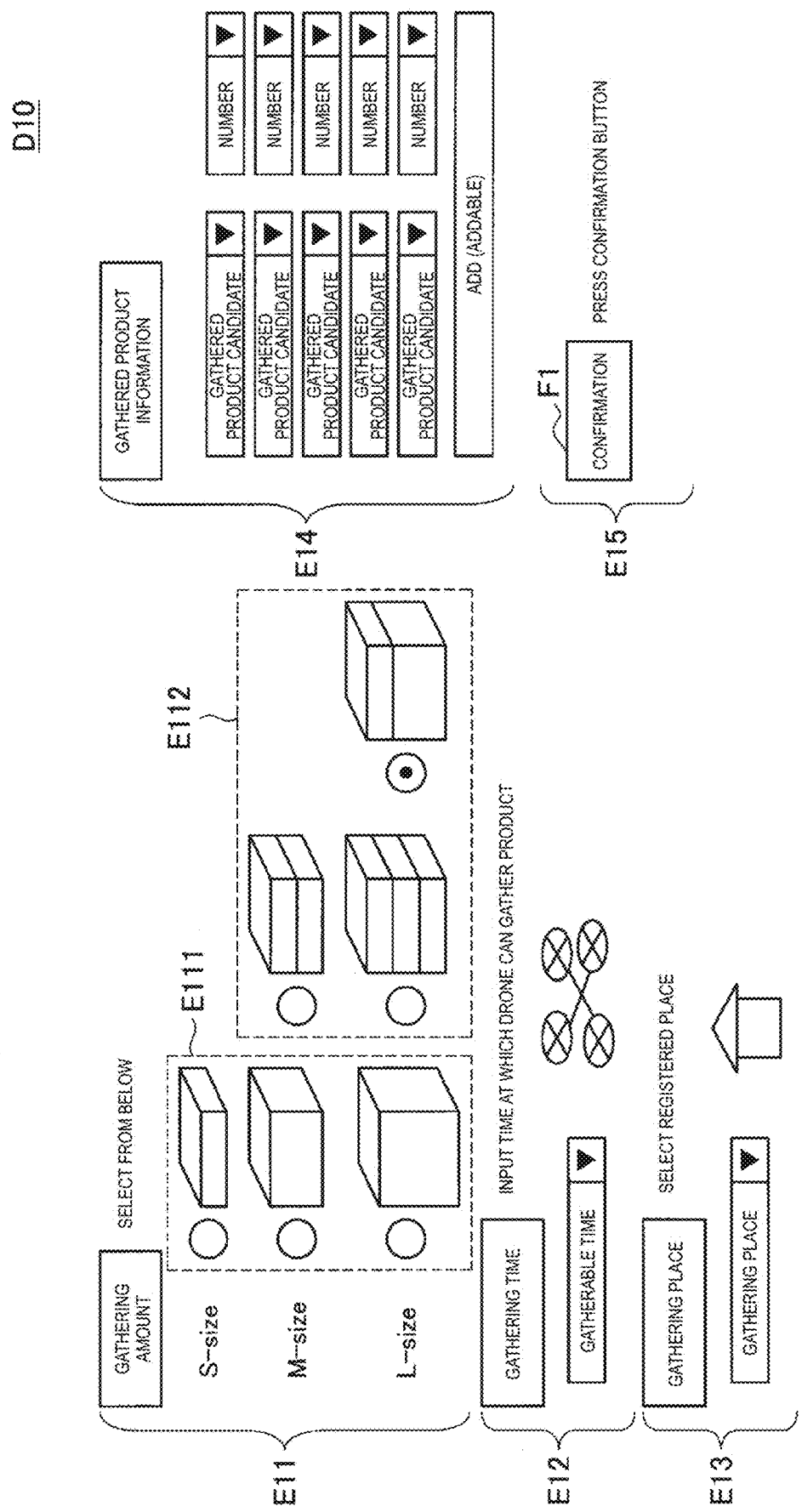
FIG. 9 is an explanatory diagram illustrating an example of an input screen displayed on a farmhouse terminal.

FIG. 9 is an explanatory diagram illustrating an example of an input screen D10 displayed on the farmhouse terminal 25 and used for the user of the farmhouse 20 to input information necessary for the drone 40 to transport farm products. The input screen D10 illustrated in FIG. 9 is equivalent to the screen used for the user of the farmhouse 20 to select the container 200 to be conveyed by the drone 40 from the candidates for the container 200.

As illustrated in FIG. 9, the input screen D10 includes a region E11 for selecting the container 200 to be conveyed by the drone 40 from the candidates for the container 200, a region E12 for inputting a time at which the drone 40 can collect the container 200, a region E13 for inputting the position of the container 200 to be collected by the drone 40, a region E14 for selecting a farm product which is a gathered product accommodated in the container 200 from candidates for the farm product, and a region E15 for switching a displayed screen to a screen for final confirmation of input content.

In the region E11 illustrated in FIG. 9, the containers 200 with mutually different sizes may be set as the candidates for the containers 200. For example, in a region E111, a container with an S size, a container with an M size of a double volume of the container with the S size, and a container with an L size of a triple volume of the container with the S size are shown as candidates for the container 200. Moreover, in the region E11 illustrated in FIG. 9, combinations of the plurality of containers 200 may be set as the candidates of the containers 200. For example, in a region E112, a combination of two containers with the S size, a combination of three containers with the S size, and a combination of one container with the S size and one container with the M size are shown as candidates for the containers 200. A total volume of a combination of the plurality of containers 200 can be set such that a total weight of the combination of the plurality of containers 200 in the state in which farm products are accommodated does not exceed the loadable weight of the drone 40. The user of the farmhouse 20 can input information indicating the dimensions and the number of containers 200 by selecting the containers 200 to be conveyed by the drone 40 from the candidates for the containers 200 in the region E11.

Figure 10:
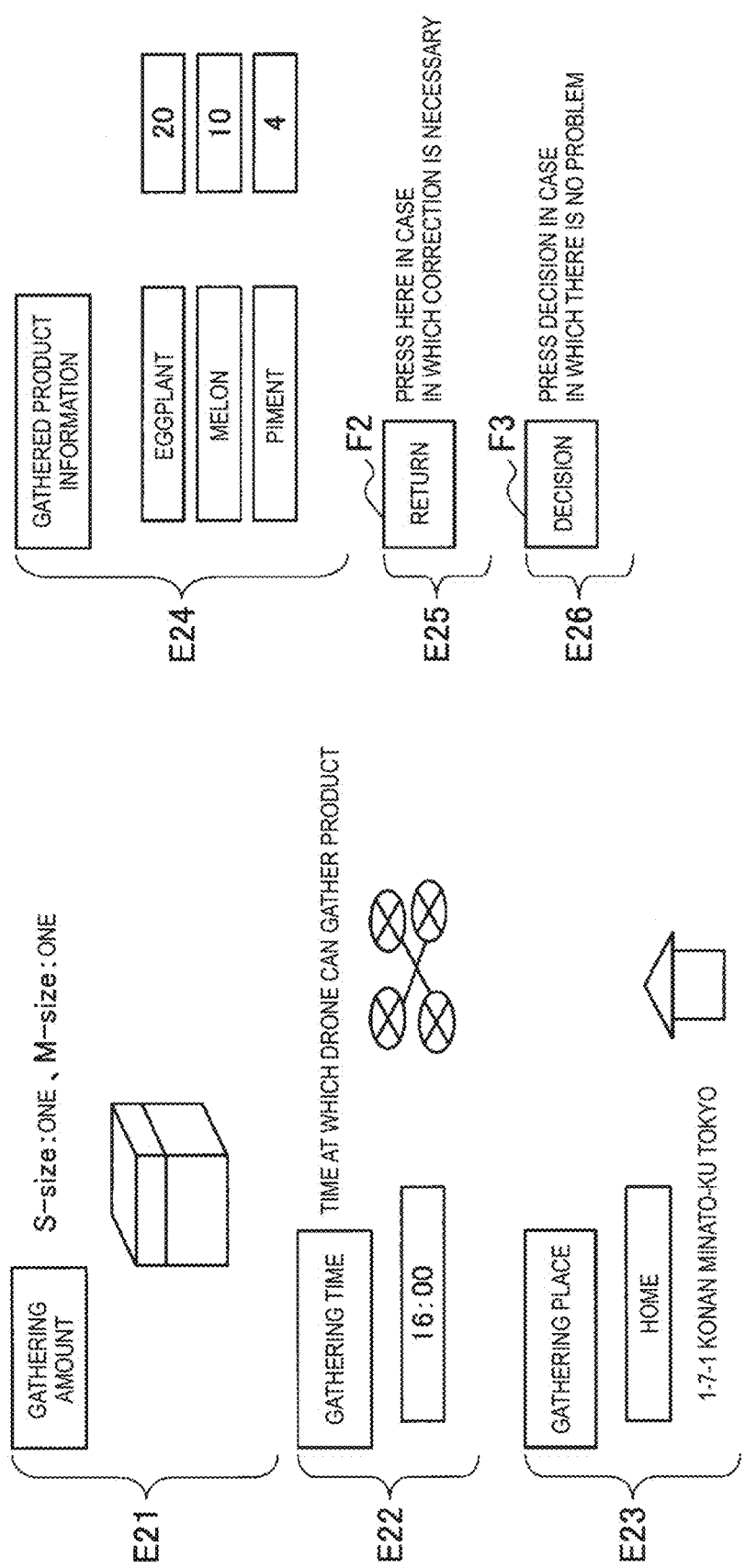
FIG. 10 is an explanatory diagram illustrating an example of a confirmation screen displayed on the farmhouse terminal.

When a confirmation button F1 is selected in the region E15 of the input screen D10, the display information control unit 806 switches a screen displayed by the farmhouse terminal 25 to a confirmation screen D20 illustrated in FIG. 10. The confirmation screen D20 illustrated in FIG. 10 is a screen used for the user of the farmhouse 20 to finally confirm content input on the input screen D10.

As illustrated in FIG. 10, the confirmation screen D20 includes regions E21, E22, E23, and E24 indicating input results respectively corresponding to the regions E11, E12, E13, and E14 of the input screen D10 in FIG. 9. Moreover, as illustrated in FIG. 10, the confirmation screen D20 includes a region E25 for starting a manipulation of correcting the input content and a region E26 for transmitting the input information to the transportation management server 80 after the input content is confirmed again. When a return button F2 in the region E25 of the confirmation screen D20 is selected, for example, the display information control unit 806 switches the screen displayed by the farmhouse terminal 25 to the input screen D10 illustrated in FIG. 9. When a decision button F3 in the region E26 of the confirmation screen D20 illustrated in FIG. 10 is selected, the farmhouse terminal 25 transmits information input by the user of the farmhouse 20 to the transportation management server 80.

In the transportation management server 80 according to the embodiment, as described above, the storage unit 804 stores the candidates for the container 200 accommodating farm products and conveyed by the drone 40 in advance in the transportation of the farm products by the drone 40. Moreover, the display information control unit 806 controls the display of the screen used for the user of the farmhouse 20 to select the container 200 to be conveyed by the drone 40 from the candidates of the container 200. Here, the weight of a farm product is substantially proportional to the volume of the farm product. Therefore, a maximum value of the weight of the container 200 in the state in which a farm product is accommodated can be calculated in accordance with the volume of the container 200. Accordingly, by allowing the user of the farmhouse 20 to select the container 200 to be conveyed by the drone 40 from the candidates for the container 200 set in advance, the transportation schedule data of the drone 40 can be generated so that the weight of the container 200 to be conveyed by the drone 40 is less than the loadable weight of the drone 40. Accordingly, it is possible to prevent the flight attitude of the drone 40 from being unstable due to the weight of the container 200 to be conveyed by the drone 40 exceeding the loadable weight of the drone 40. Therefore, it is possible to realize the more stable transportation of farm products in the transportation of the farm products by the drone 40.

(Transportation Control Unit)

The transportation control unit 808 is realized by a CPU and manages the transportation of farm products by the drone 40 and the vehicle 60. In the transportation of the farm products by the drone 40, specifically, the transportation control unit 808 controls the transportation of the farm products by the drone 40 on a basis of information transmitted from the farmhouse terminal 25, the drone management server 45, and the vehicle driver terminal 65. The transportation control unit 808 controls the transportation of the farm products by the drone 40, for example, by generating the transportation schedule data of the drone 40 and transmitting the transportation schedule data to the drone management server 45.

The transportation control unit 808 may control the transportation of the farm products by the drone 40 on a basis of information regarding the container 200 selected by the user of the farmhouse 20 on the input screen D10 illustrated in FIG. 9 as the information transmitted from the farmhouse terminal 25. For example, the transportation control unit 808 may generate the transportation schedule data of the drone 40 on the basis of the information regarding the container 200. Moreover, the transportation control unit 808 may start to generate the transportation schedule data of the drone 40 using acquisition of the information transmitted from the farmhouse terminal 25 as a trigger. The information regarding the container 200 can include information indicating the number of containers 200, information indicating a time at which the drone 40 can collect the container 200, and information indicating the position of the container 200, which are input by the user of the farmhouse 20.

The transportation control unit 808 generates the transportation schedule data of the drone 40 on the basis of the information indicating the number of containers 200 selected by the user of the farmhouse 20. Then, the transportation schedule data of the drone 40 can be generated so that the operation efficiency of the drone 40 is improved in accordance with the total weight of the collection target containers 200 of the farmhouses 20. For example, in a case in which the total weight of the collection target containers 200 of two farmhouses 20 is less than the loadable weight of the drone 40, the transportation schedule data of the drone 40 can be generated so that the collection target containers 200 of the two farmhouses 20 are collected. Thus, it is possible to improve the operation efficiency of the drone 40.

The transportation control unit 808 generates the transportation schedule data of the drone 40 on the basis of the information indicating the time at which the drone 40 can collect the container 200. Then, the transportation schedule data of the drone 40 can be generated so that the operation efficiency of the drone 40 is improved in accordance with the time at which the collection target container 200 of each farmhouse 20 can be collected. For example, in a case in which the collection target containers 200 of two farmhouses 20 are collected by one drone 40, the transportation schedule data of the drone 40 can be generated so that the container 200 of the farmhouse 20 for which a time at which the container 200 can be collected is earlier can be first collected by the drone 40. Thus, it is possible to improve the operation efficiency of the drone 40.

The transportation control unit 808 generates the transportation schedule data of the drone 40 on the basis of the information indicating the position of the container 200. Then, the transportation schedule data of the drone 40 can be generated so that the operation efficiency of the drone 40 is improved in accordance with the position of the collection target container 200 of each farmhouse 20. For example, in a case in which the collection target containers 200 of two farmhouses 20 are collected by one drone 40, the transportation schedule data of the drone 40 can be generated so that the container 200 of the farmhouse 20 farther from the first gathering location 22 designated as a transportation destination can be first collected by the drone 40. Thus, it is possible to improve the operation efficiency of the drone 40.

The transportation control unit 808 may control the transportation of the farm products by the drone 40 on the basis of the information regarding the drone 40 by generating the transportation schedule data of the drone 40 on the basis of the information regarding the drone 40 transmitted from the drone management server 45. The information regarding the drone 40 transmitted from the drone management server 45 can include information indicating the position of each drone 40, information indicating whether or not each drone 40 is operable, and ID information of each drone 40.

The transportation control unit 808 generates the transportation schedule data of the drone 40 on the basis of the information indicating the position of each drone 40. Then, for example, the transportation schedule data of the drone 40 can be generated so that the farm products of the farmhouse 20 is preferentially collected by the drone 40 flying at the position closest to the farmhouse 20. Thus, it is possible to improve the operation efficiency of the drone 40.

The transportation control unit 808 may control the transportation of the farm products by the drone 40 on the basis of the information regarding the vehicle 60 by generating the transportation schedule data of the drone 40 on the basis of the information regarding the vehicle 60 transmitted from the vehicle driver terminal 65. The information regarding the vehicle 60 transmitted from the vehicle driver terminal 65 can include information regarding a traveling schedule of the vehicle 60, information indicating the size or the weight of a loadable gathered product on the vehicle 60, identification information of the vehicle 60, and information regarding a driver. The information regarding the traveling schedule of the vehicle 60 can include information indicating the first gathering location 22 through which the vehicle 60 can pass and information indicating a time at which the vehicle 60 is scheduled to pass through the first gathering location 22. In addition, the information indicating the size or the weight of a loadable gathered product on the vehicle 60 may include both pieces of information indicating the size and the weight of the gathered product.

In addition, the transportation control unit 808 may generate the transportation schedule data of the drone 40 on the basis of the gathering information of the first gathering location 22. For example, the transportation control unit 808 may generate the transportation schedule data of the drone 40 on a basis of a difference between an amount of farm products which can be accommodated in each first gathering location 22 and an amount of farm products which are currently accommodated.

The transportation control unit 808 can generate the appropriate transportation schedule data of the drone 40 on the basis of the traveling schedule of the vehicle 60 by generating the transportation schedule data of the drone 40 on the basis of the information regarding the traveling schedule of the vehicle 60. For example, the transportation schedule data of the drone 40 can be generated so that the first gathering location 22 through which many vehicles 60 can pass among the plurality of first gathering locations 22 is preferentially designated as a transportation destination of the farm products by the drone 40. Thus, more farm products can be transported from the farmhouses 20 to the second gathering location 24.

In the transportation of the farm products by the vehicle 60, specifically the transportation control unit 808 notifies the driver of the vehicle 60 of the transportation schedule data of the vehicle 60 by generating the transportation schedule data of the vehicle 60 and transmitting the transportation schedule data to the vehicle driver terminal 65 on the basis of the generated transportation schedule data of the drone 40. More specifically, the transportation control unit 808 generates the transportation schedule data of the vehicle 60 on the basis of the amount of farm products gathering in the first gathering location 22 requested from the traveling schedule of each vehicle 60 and the transportation schedule of the drone 40 and a time at which the farm products are gathered in the first gathering location 22.

Moreover, when the gathering of the farm products in the first gathering location 22 by the drone 40 is entirely completed, the transportation control unit 808 transmits information indicating that the gathering of the farm products scheduled to be gathered in the first gathering location 22 is entirely completed to the vehicle driver terminal 65 on the basis of the gathering information of the first gathering location 22 transmitted from the drone 40. Thus, the transportation of the farm products in accordance with the transportation schedule data of the vehicle 60 can be performed by the driver of the vehicle 60.

(Billing Control Unit)

The billing control unit 810 is realized by a CPU and controls billing for each of the user of the farmhouse 20, a manager of the drone 40, and the driver of the vehicle 60. Specifically, the billing control unit 810 bills the driver of each vehicle 60 for a price equivalent to the transportation of the farm products from the first gathering location 22 to the second gathering location 24 by each vehicle 60. For example, the billing control unit 810 performs a billing process on the driver of each vehicle 60 after the gathering information of the second gathering location 24 transmitted from the vehicle driver terminal 65 and the transportation schedule data of the vehicle 60 are compared to each other. Here, the gathering information of the second gathering location 24 can include the ID information of the farmhouse 20 in regard to the farm products of which the transportation by the vehicle 60 is completed. Specifically, the billing control unit 810 acquires the ID information of the farmhouse 20 in regard to the farm products transported to the second gathering location 24 by each vehicle 60 and compares the acquired ID information with the ID information of the farmhouse 20 in regard to the farm products scheduled to be transported by each vehicle 60 in the transportation schedule data of the vehicle 60. Thus, it is possible to confirm that the farm products scheduled to be transported by each vehicle 60 are actually transported to the second gathering location 24 by each vehicle.

Moreover, the billing control unit 810 bills the manager of the drone 40 for a price equivalent to the transportation of the farm products from the farmhouse 20 to the first gathering location 22 by the drone 40. For example, the billing control unit 810 performs a billing process on the manager of the drone 40 after the gathering information of the first gathering location 22 transmitted from the drone 40 is compared with the transportation schedule data of the drone 40. Here, the gathering information of the first gathering location 22 can include the ID information of the farmhouse 20 in regard to the farm products of which the transportation by the drone 40 is completed. Specifically, the billing control unit 810 acquires the ID information of the farmhouse 20 in regard to the farm products transported to the first gathering location 22 by the drone 40 and compares the acquired ID information with the ID information of the farmhouse 20 in regard to the farm products scheduled to be transported by the drone 40 in the transportation schedule data of the drone 40. Thus, it is possible to confirm that the farm products scheduled to be transported by the drone 40 are actually transported to the first gathering location 22 by the drone 40.

Moreover, the billing control unit 810 bills the user of each farmhouse 20 for a price equivalent to the farm products of each farmhouse 20 transported to the second gathering location 24. For example, the billing control unit 810 compares the gathering information of the second gathering location 24 with the transportation schedule data. Specifically, the billing control unit 810 acquires the ID information of the farmhouse 20 in regard to the farm products transported to the second gathering location 24 and compares the acquired ID information with the ID information of the farmhouse 20 in regard to the farm products scheduled to be transported from the farmhouse 20 to the second gathering location 24 in the transportation schedule data of the drone 40 and the vehicle 60. Thus, it is possible to confirm that the farm products scheduled to be transported from the farmhouse 20 to the second gathering location 24 are actually transported to the second gathering location 24. Thereafter, quality of each farm product gathered in the second gathering location 24 is evaluated. The billing control unit 810 calculates an amount of money of each farm product in accordance with a result of the quality evaluation of each farm product and performs the billing process on the user of each farmhouse 20 on the basis of the amount of money.

[4-2. Operation]

Next, a flow of a process performed by the transportation management server 80 according to the embodiment will be described.

(Transportation Schedule Data Generation Process)

Figure 11:
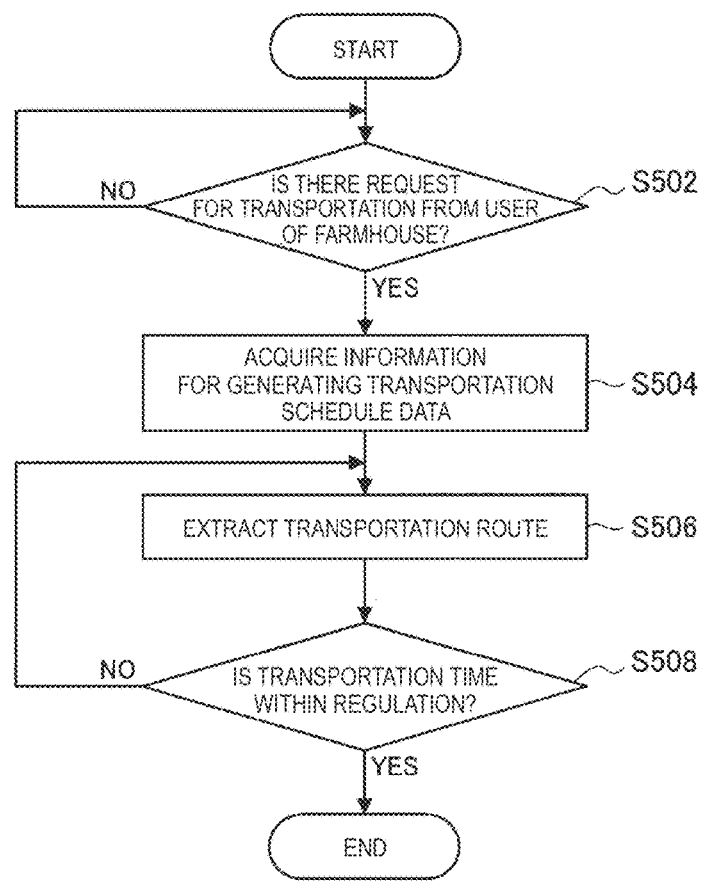
FIG. 11 is a flowchart illustrating an example of a flow of a transportation schedule data generation process performed by the transportation management server according to the embodiment.

FIG. 11 is a flowchart illustrating an example of a flow of a transportation schedule data generation process performed by the transportation management server 80 according to the embodiment. As illustrated in FIG. 11, the transportation control unit 808 first determines whether or not there is a request for transporting the farm products from the user of the farmhouse 20 (step S502). For example, the transportation control unit 808 determines that there is a request for transporting the farm products from the user of the farmhouse 20 in that information transmitted from the farmhouse terminal 25 is acquired. In a case in which the transportation control unit 808 determines there is no request for transporting the farm products from the user of the farmhouse 20 (No in S502), the determination process of step S502 is repeated. Conversely, in a case in which the transportation control unit 808 determines that there is the request for transporting the farm products from the user of the farmhouse 20 (Yes in step S502), the transportation control unit 808 acquires the information for generating the transportation schedule data of the drone 40 (step S504). Specifically, the transportation control unit 808 acquires information transmitted from the farmhouse terminal 25, the drone management server 45, and the vehicle driver terminal 65.

Then, the transportation control unit 808 extracts a flight path which is a transportation route of each drone 40 on the basis of the various kinds of acquired information (step S506). Subsequently, the transportation control unit 808 determines whether or not a transportation time for the transportation route of each drone 40 is within a regulation (step S508). In a case in which the transportation control unit 808 determines that the transportation time for the transportation route of each drone 40 is not within the regulation (No in S508), the process returns to step S506. Conversely, in a case in which the transportation control unit 808 determines that the transportation time for the transportation route of each drone 40 is within the regulation (Yes in S508), the process illustrated in FIG. 11 ends and the generation of the transportation schedule data of the drone 40 is completed. Moreover, the transportation control unit 808 generates the transportation schedule data of the vehicle 60 on the basis of the transportation schedule data of the drone 40.

(Process Related to Transportation Between Farmhouse and First Gathering Location)

Figure 12:
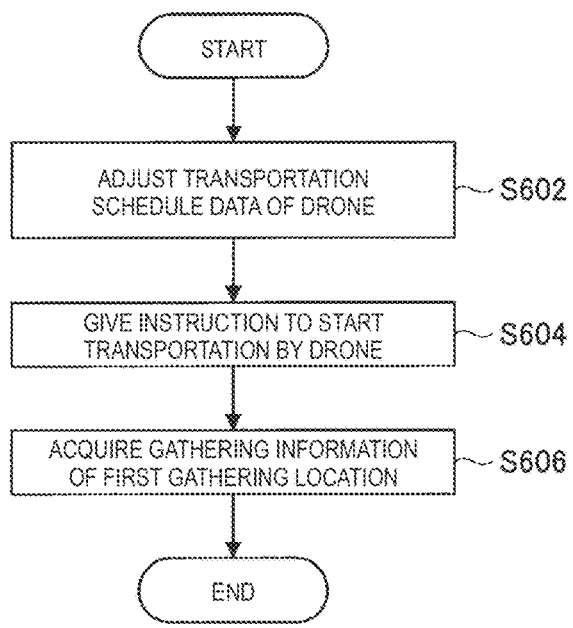
FIG. 12 is a flowchart illustrating an example of a flow of a process related to transportation between a farmhouse and a first gathering location and performed by the transportation management server according to the embodiment.

FIG. 12 is a flowchart illustrating an example of a flow of a process related to transportation between the farmhouse 20 and the first gathering location 22 and performed by the transportation management server 80 according to the embodiment. As illustrated in FIG. 12, the transportation control unit 808 first adjusts the transportation schedule data of the drone 40 (step S602). For example, in a case in which the total weight of the containers 200 scheduled to be transported by two drones 40 is less than the loadable weight of one drone 40, the transportation control unit 808 adjusts the transportation schedule data of the drone 40 so that the containers 200 scheduled to be transported by the two drones 40 are transported together. Then, the transportation control unit 808 gives an instruction to start the transportation of the farm products by the drone 40 by transmitting the transportation schedule data of the drone 40 to the drone management server 45 (step S604). Thereafter, the communication unit 802 acquires the gathering information of the first gathering location 22 transmitted from the drone 40 (step S606) and ends the process illustrated in FIG. 12.

(Process Related to Transportation Between First Gathering Location and Second Gathering Location)

Figure 13:
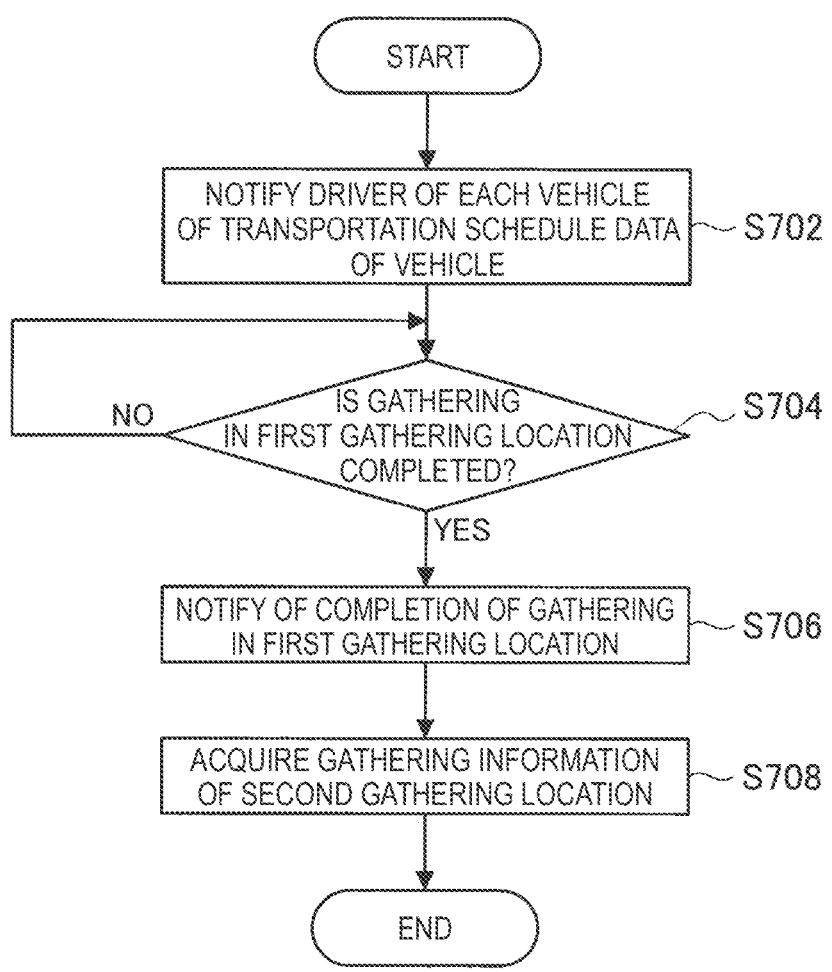
FIG. 13 is a flowchart illustrating an example of a flow of a process related to transportation between the first gathering location and a second gathering location and performed by the transportation management server according to the embodiment.

FIG. 13 is a flowchart illustrating an example of a flow of a process related to the transportation between the first gathering location 22 and the second gathering location 24 and performed by the transportation management server 80 according to the embodiment. As illustrated in FIG. 13, the transportation control unit 808 first notifies the driver of each vehicle 60 of the generated transportation schedule data of the vehicle 60 by transmitting the transportation schedule data to the vehicle driver terminal 65 of each vehicle 60 (step S702). Subsequently, the transportation control unit 808 determines whether or not the gathering of the farm products scheduled to be gathered in the first gathering location 22 is entirely completed on the basis of the gathering information of the first gathering location 22 (step S704). In a case in which the transportation control unit 808 determines that the gathering of the farm products scheduled to be gathered in the first gathering location 22 is not entirely completed (No in S704), the determination process of step S704 is repeated. Conversely, in a case in which the transportation control unit 808 determines that the gathering of the farm products scheduled to be gathered in the first gathering location 22 is entirely completed (Yes in S704), the transportation control unit 808 notifies the driver of each vehicle 60 of the information indicating that the gathering in the first gathering location 22 is entirely completed by transmitting the information to the vehicle driver terminal 65 of each vehicle 60 (step S706). Thereafter, the communication unit 802 acquires the gathering information of the second gathering location 24 transmitted from the vehicle driver terminal 65 (step S708), and then the process illustrated in FIG. 13 ends.

(Billing Process)

Figure 14:
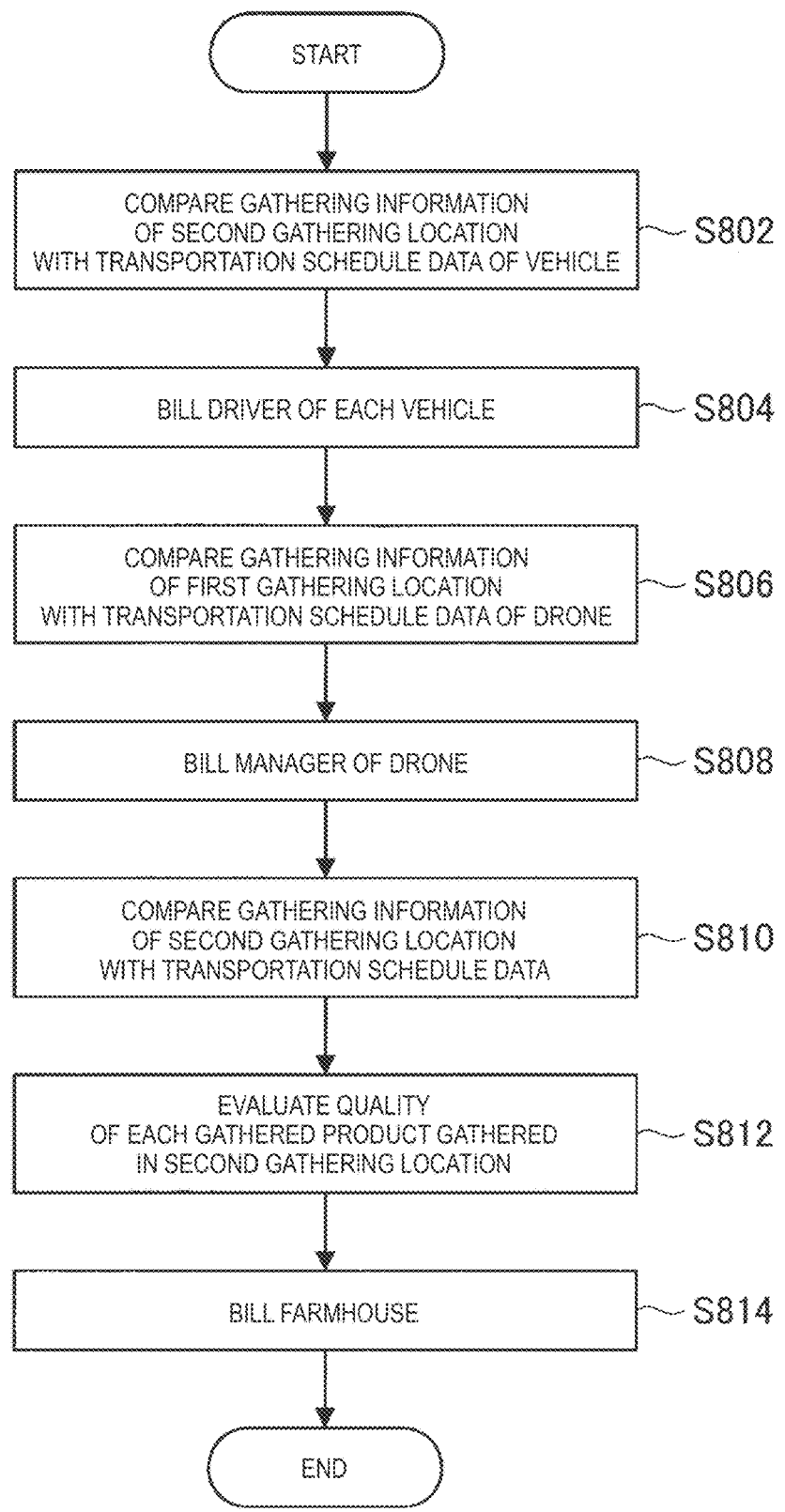
FIG. 14 is a flowchart illustrating an example of a flow of a billing process performed by the transportation management server according to the embodiment.

FIG. 14 is a flowchart illustrating an example of a flow of the billing process performed by the transportation management server 80 according to the embodiment. As illustrated in FIG. 14, the billing control unit 810 first compares the gathering information of the second gathering location 24 with the transportation schedule data of the vehicle 60 (step S802). Then, the billing control unit 810 performs the billing process on the driver of each vehicle 60 (step S804). Subsequently, the billing control unit 810 compares the gathering information of the first gathering location 22 with the transportation schedule data of the drone 40 (step S806). Then, the billing control unit 810 performs the billing process on the manager of the drone 40 (step S808).

Subsequently, the billing control unit 810 compares the gathering information of the second gathering location 24 with the transportation schedule data of the drone 40 and the vehicle 60 (step S810). Then, the quality of each farm product gathered in the second gathering location 24 is evaluated (step S812). The billing control unit 810 calculates an amount of money of each farm product in accordance with a result of the quality evaluation of each farm product and performs the billing process on the user of each farmhouse 20 on the basis of the amount of money (step S814). Then, the process illustrated in FIG. 14 ends.

5. Hardware Configuration

The embodiment of the present disclosure has been described above. The above-described process by the transportation management server 80 is realized by cooperation of software and hardware of the transportation management server 80 to be described below.

Figure 15:
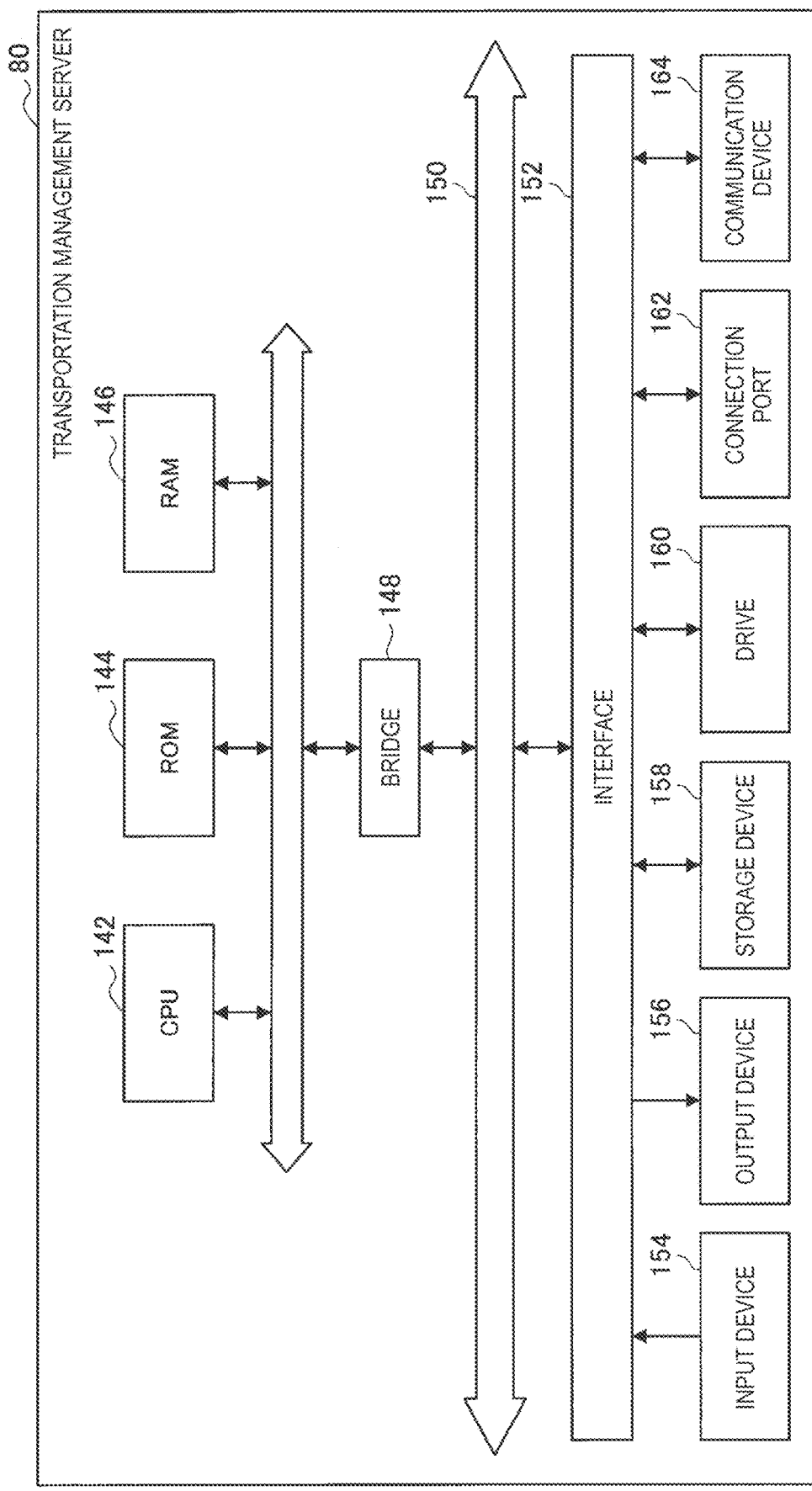
FIG. 15 is an explanatory diagram illustrating an example of a hardware configuration of the transportation management server according to the present disclosure.

FIG. 15 is an explanatory diagram illustrating an example of a hardware configuration of the transportation management server 80 according to the present disclosure. As illustrated in FIG. 15, the transportation management server 80 includes a central processing unit (CPU) 142, a read-only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device, and realizes an operation of each functional configuration in the transportation management server 80 in cooperation with various programs. Moreover, the CPU 142 may be a microprocessor. The ROM 144 stores arithmetic parameters, a program, and the like to be used by the CPU 142. The RAM 146 temporarily stores a program to be used for execution by the CPU 142 and parameters or the like appropriately changed in the execution. The CPU 142, the ROM 144, and the RAM 146 are connected to each other by an internal bus including a CPU bus.

The input device 154 is, for example, input means such as a mouse, a keyboard, a touch panel, a button, a microphone, a switch, and a lever used for an operator to input information and includes an input control circuit that generates an input signal on a basis of an input by the operator and outputs the input signal to the CPU 142. The operator of the information processing device 70 can instruct the transportation management server 80 to input various kinds of data and perform a processing operation by manipulating the input device 154.

The output device 156 performs outputting to, for example, a device such as a liquid crystal display (LCD) device, an organic light-emitting diode (OLED) device, or a lamp. Further, the output device 156 may output sounds of a speaker, a headphone, and the like.

The storage device 158 is a data storage device. The storage device 158 may includes a storage medium, a recording device that records data on the storage medium, a reading device that reads the data from the storage medium, and an erasure device that erases the data recorded on the storage medium. The storage device 158 stores various kinds of data or a program to be executed by the CPU 142.

The drive 160 is a storage medium reader and writer and is contained in the transportation management server 80 or is externally attached. The drive 160 reads information recorded on a mounted magnetic disk, optical disc, magneto-optical disc, or removable storage medium such as a semiconductor memory and outputs the information to the RAM 144. Moreover, the drive 160 can also write information on the removable storage medium.

The connection port 162 is, for example, a bus for connection with an external information processing device or a peripheral device of the transportation management server 80. Moreover, the connection port 162 may be a universal serial bus (USB).

The communication device 164 is, for example, a communication interface including a communication device for connection to a network. Moreover, the communication device 164 may be an infrared communication-compatible device, a wireless Local Area Network (LAN)-compatible communication device, a Long Term Evolution (LTE)-compatible communication device, or a wired communication device performing wired communication.

6. Conclusion

As described above, according to the embodiment of the present disclosure, a display control unit controls display of a screen used for a user to select a container to be conveyed by an unmanned flyer from candidates for the container on a basis of the candidates for the container accommodating an article and conveyed by the unmanned flyer in article transportation by the unmanned flyer. Here, the weight of an article can be substantially proportional to the volume of the article. Therefore, a maximum value of the weight of a container in a state in which the article is accommodated can be calculated in accordance with the volume of the container. Accordingly, by allowing a user to select a container to be conveyed by the unmanned flyer from the candidates for the container set in advance, the transportation schedule data of the unmanned flyer can be generated so that the weight of the container to be conveyed by the unmanned flyer is less than the loadable weight of the unmanned flyer. Accordingly, it is possible to prevent a flight attitude of the unmanned flyer from being unstable since the weight of the container to be conveyed by the unmanned flyer exceeds the loadable weight of the unmanned flyer. Therefore, it is possible to realize the more stable transportation of article in the transportation of the article by the unmanned flyer.

The example in which the drone 40 communicates with the transportation management server 80 via the drone management server 45 has been described above, but the technical scope of the present disclosure is not limited to such an example. The drone 40 may directly communicate with the transportation management server 80.

The example in which the gathering information of the first gathering location is transmitted from the drone 40 has been described above, but the technical scope of the present disclosure is not limited to such an example. The gathering information of the first gathering location 22 may be transmitted from an information processing device (not illustrated) provided in the first gathering location 22. In such a case, for example, the gathering information of the first gathering location 22 may be transmitted on a basis of an input by an operator of the first gathering location 22 or may be transmitted on a basis of an identification result of the container 200 by a device (not illustrated) that is provided in the first gathering location 22 and can identify the container 200.

The example in which the gathering information of the second gathering location is transmitted from the vehicle driver terminal 65 has been described above, but the technical scope of the present disclosure is not limited to such an example. The gathering information of the second gathering location 24 may be transmitted from an information processing device of the second gathering location 24. In such a case, for example, the gathering information of the second gathering location 24 may be transmitted on a basis of an input by an operator of the second gathering location 24 or may be transmitted on a basis of an identification result of the container 200 by a device (not illustrated) that is provided in the second gathering location 24 and can identify the container 200.

The example in which the farm products are transported from the farmhouse 20 to the second gathering location 24 in the transportation of the farm products by the drone 40 and the vehicle 60 has been described above, but the technical scope of the present disclosure is not limited to such an example. A transportation destination of the farm products may be appropriately designated by a user. For example, a region used for the user to designate the transportation destination of the farm products may be additionally displayed on the input screen D10 illustrated in FIG. 9. By causing the transportation control unit 808 to manage the transportation of the farm products by the drone 40 and the vehicle 60 so that the farm products are transported to the transportation destination input by the user in the region, it is possible to realize the transportation of the farm products to the transportation destination designated by the user.

In addition, the series of control processes by each device described in the present specification may be realized using one of software, hardware, and a combination of the software and the hardware. For example, a program including the software is stored in advance on a storage medium (non-transitory media) provided internally or externally in each device. Then, for example, each program is read to the RAM at the time of execution and is executed by a processor such as the CPU.

Moreover, the process described using the flowchart in the present specification may not necessarily be performed in the order shown in the flowchart. Several processing steps may be performed in parallel. Moreover, additional processing steps may be adopted or some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a display information control unit configured to control display of a screen used for a user to select a container to be conveyed by an unmanned flyer from candidates for the container on a basis of the candidates for the container accommodating an article and conveyed by the unmanned flyer in article transportation by the unmanned flyer.

(2)

The information processing device according to (1), in which, in the container, a holding mechanism that holds the article is provided at a position substantially matching a position of the center of gravity of the unmanned flyer on a horizontal plane.

(3)

The information processing device according to (1) or (2), in which an ID identification portion for identifying an ID of the user is provided in the container.

(4)

The information processing device according to any one of (1) to (3), in which, in the article transportation by the unmanned flyer, a plurality of the containers are conveyed by the unmanned flyer in a mutually stacked state.

(5)

The information processing device according to any one of (1) to (4), including:

a transportation control unit configured to control the article transportation by the unmanned flyer on a basis of information regarding the container selected by the user on the screen.

(6)

The information processing device according to (5), in which the information regarding the container includes information indicating a number of the containers.

(7)

The information processing device according to (5) or (6), in which the information regarding the container includes information indicating a time at which the unmanned flyer is able to collect the container.

(8)

The information processing device according to any one of (5) to (7), in which the information regarding the container includes information indicating a position of the container.

(9)

The information processing device according to (5), in which the transportation control unit controls the article transportation by the unmanned flyer on a basis of information regarding the unmanned flyer.

(10)

The information processing device according to (9), in which the information regarding the unmanned flyer includes information indicating a position of the unmanned flyer.

(11)

The information processing device according to (9) or (10), in which the information regarding the unmanned flyer includes information indicating whether or not the unmanned flyer is operable.

(12)

The information processing device according to any one of (9) to (11), in which the information regarding the unmanned flyer includes ID information of the unmanned flyer.

(13)

The information processing device according to (5), in which the transportation control unit controls the article transportation by the unmanned flyer on a basis of information regarding a vehicle that further transports the article transported by the unmanned flyer.

(14)

The information processing device according to (13), in which the information regarding the vehicle includes information regarding a traveling schedule of the vehicle.

(15)

The information processing device according to (13) or (14), in which the information regarding the vehicle includes information indicating a size or a weight of an article which is loadable on the vehicle.

(16)

The information processing device according to any one of (13) to (15), in which the information regarding the vehicle includes identification information of the vehicle.

(17)

The information processing device according to any one of (13) to (16), in which the information regarding the vehicle includes information regarding a driver of the vehicle.

(18)

The information processing device according to any one of (1) to (17), in which the display information control unit controls display of the screen by a terminal used by the user.

(19)

An information processing method including:

controlling, by an information processing device, display of a screen used for a user to select a container to be conveyed by an unmanned flyer from candidates for the container on a basis of the candidates for the container accommodating an article and conveyed by the unmanned flyer in article transportation by the unmanned flyer.

(20)

A transportation system including:

an information processing device configured to control an unmanned flyer that transports an article accommodated in a container selected by a user and transportation of the article by the unmanned flyer, in which the information processing device includes a display information control unit that controls display of a screen used for a user to select the container to be conveyed by the unmanned flyer from candidates for the container on a basis of the candidates for the container accommodating the article and conveyed by the unmanned flyer in article transportation by the unmanned flyer, and a transportation control unit that controls the article transportation by the unmanned flyer on a basis of information regarding the container selected by the user on the screen.

| Reference Signs List | |
|---|---|
| 1 | transportation system |
| 20 | farmhouse |
| 22 | first gathering location |
| 24 | second gathering location |
| 25 | farmhouse terminal |
| 40, 40a | drone |
| 42 | gripping mechanism |
| 45 | drone management server |
| 46 | mirror |
| 60 | vehicle |
| 65 | vehicle driver terminal |
| 70 | information processing device |
| 80 | transportation management server |
| 80 | direct transportation management server |
| 142 | central processing unit (CPU) |
| 144 | read-only memory (ROM) |
| 146 | random access memory (RAM) |
| 148 | bridge |
| 150 | bus |
| 152 | interface |
| 154 | input device |
| 156 | output device |
| 158 | storage device |

-continued

| Reference Signs List | |
|---|---|
| 160 | drive |
| 162 | connection port |
| 164 | communication device |
| 200, 200a, 200b, 200c, 200d | container |
| 202 | holding mechanism |
| 204 | connection mechanism |
| 206 | identification portion |
| 401 | imaging device |
| 404a, 404b, 404c, 404d | rotor |
| 408a, 408b, 408c, 408d | motor |
| 410 | control unit |
| 420 | communication unit |
| 430 | sensor unit |
| 432 | positional information acquisition unit |
| 440 | storage unit |
| 450 | battery |
| 802 | communication unit |
| 804 | storage unit |
| 806 | display information control unit |
| 808 | transportation control unit |
| 810 | billing control unit |

The invention claimed is:

1. An information processing device comprising:
a display information control unit configured to control display of a screen used for a user to select a container to be conveyed by an unmanned flyer from candidates for the container on a basis of the candidates for the container accommodating an article to be conveyed by the unmanned flyer in article transportation by the unmanned flyer to a gathering location for transportation by a vehicle; and
a transportation control unit configured to control conveyance of the article by the unmanned flyer to the gathering location and to control transportation of the article by the vehicle from the gathering location.

2. The information processing device according to claim 1, wherein, in the container, a holding mechanism that holds the article is provided at a position substantially matching a position of the center of gravity of the unmanned flyer on a horizontal plane.

3. The information processing device according to claim 1, wherein an ID identification portion for identifying an ID of the user is provided in the container.

4. The information processing device according to claim 1, wherein, in the article transportation by the unmanned flyer, a plurality of the containers are conveyed by the unmanned flyer in a mutually stacked state.

5. The information processing device according to claim 1, comprising: wherein
the transportation control unit is configured to control the article transportation by the unmanned flyer on a basis of information regarding the container selected by the user on the screen.

6. The information processing device according to claim 5, wherein the information regarding the container includes information indicating a number of the containers.

7. The information processing device according to claim 5, wherein the information regarding the container includes information indicating a time at which the unmanned flyer is able to collect the container.

8. The information processing device according to claim 5, wherein the information regarding the container includes information indicating a position of the container.

9. The information processing device according to claim 5, wherein the transportation control unit controls the article transportation by the unmanned flyer on a basis of information regarding the unmanned flyer.

10. The information processing device according to claim 9, wherein the information regarding the unmanned flyer includes information indicating a position of the unmanned flyer.

11. The information processing device according to claim 9, wherein the information regarding the unmanned flyer includes information indicating whether or not the unmanned flyer is operable.

12. The information processing device according to claim 9, wherein the information regarding the unmanned flyer includes ID information of the unmanned flyer.

13. The information processing device according to claim 5, wherein the transportation control unit controls the article transportation by the unmanned flyer on a basis of information regarding the vehicle that further transports the article transported by the unmanned flyer.

14. The information processing device according to claim 13, wherein the information regarding the vehicle includes information regarding a traveling schedule of the vehicle.

15. The information processing device according to claim 13, wherein the information regarding the vehicle includes information indicating a size or a weight of an article which is loadable on the vehicle.

16. The information processing device according to claim 13, wherein the information regarding the vehicle includes identification information of the vehicle.

17. The information processing device according to claim 13, wherein the information regarding the vehicle includes information regarding a driver of the vehicle.

18. The information processing device according to claim 1, wherein the display information control unit controls display of the screen by a terminal used by the user.

19. An information processing method comprising:
controlling, by an information processing device, display of a screen used for a user to select a container to be conveyed by an unmanned flyer from candidates for the container on a basis of the candidates for the container accommodating an article to be conveyed by the unmanned flyer in article transportation by the unmanned flyer to a gathering location for transportation by a vehicle;
controlling, by the information processing device, conveyance of the article by the unmanned flyer to the gathering location; and
controlling, by the information processing device, transportation of the article by the vehicle from the gathering location.

20. A transportation system comprising:
an information processing device configured to control an unmanned flyer that transports an article accommodated in a container selected by a user and transportation of the article by the unmanned flyer,
wherein the information processing device includes
a display information control unit configured to control display of a screen used for a user to select the container to be conveyed by the unmanned flyer from candidates for the container on a basis of the candidates for the container accommodating the article to be conveyed by the unmanned flyer in article transportation by the unmanned flyer, and
a transportation control unit configured to control conveyance of the article by the unmanned flyer to the gathering location and to control transportation of the article by the vehicle from the gathering location.

* * * * *